United States Patent
Lemoff et al.

(10) Patent No.: US 11,740,445 B2
(45) Date of Patent: *Aug. 29, 2023

(54) ADVANCED OPTICAL DESIGNS FOR IMAGING SYSTEMS

(71) Applicant: Tectus Corporation, Saratoga, CA (US)

(72) Inventors: Brian Elliot Lemoff, Morgan Hill, CA (US); Flint Orin Hamblin, Saratoga, CA (US); George Michael Mihalakis, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 17/225,523

(22) Filed: Apr. 8, 2021

(65) Prior Publication Data

US 2021/0223576 A1 Jul. 22, 2021

Related U.S. Application Data

(63) Continuation-in-part of application No. 16/895,077, filed on Jun. 8, 2020, now Pat. No. 11,294,159, which
(Continued)

(51) Int. Cl.
*G02B 17/06* (2006.01)
*G02C 11/00* (2006.01)
*G02C 7/04* (2006.01)

(52) U.S. Cl.
CPC .......... *G02C 11/10* (2013.01); *G02B 17/0615* (2013.01); *G02C 7/04* (2013.01)

(58) Field of Classification Search
None
See application file for complete search history.

(56) References Cited

U.S. PATENT DOCUMENTS

| 4,711,512 A | 12/1987 | Upatnieks |
| 4,792,685 A | 12/1988 | Yamakawa |

(Continued)

FOREIGN PATENT DOCUMENTS

| GB | 1216075 A | 12/1970 |
| WO | 2012037290 A2 | 3/2012 |

OTHER PUBLICATIONS

"8.2 All-Reflecting Two-Mirror Telescopes," Datasheet telescope-optics, telescope-optics.net, Aug. 3, 2016, 4 pages, [Online] [Retrieved on Dec. 14, 2017] Retrieved from the Internet<URL: https://web.archive.Org/web/20160803183105/http://www.telescope-optics.net/two-mmirror.htm>.
(Continued)

*Primary Examiner* — Darryl J Collins
(74) *Attorney, Agent, or Firm* — Fenwick & West LLP

(57) ABSTRACT

An eye-mounted device includes a contact lens and an embedded imaging system. The front aperture of the imaging system faces away from the user's eye so that the image sensor in the imaging system detects imagery of a user's external environment. The optics for the imaging system has a folded optical path, which is advantageous for fitting the imaging system into the limited space within the contact lens. In one design, the optics for the imaging system is based on a two mirror design, with a concave mirror followed by a convex mirror.

20 Claims, 19 Drawing Sheets

Related U.S. Application Data is a continuation-in-part of application No. 16/034,761, filed on Jul. 13, 2018, now Pat. No. 10,712,564.

(56) References Cited

U.S. PATENT DOCUMENTS

| | | | |
|---|---|---|---|
| 5,638,218 | A | 6/1997 | Oomura |
| 5,638,219 | A | 6/1997 | Medina Puerta |
| 6,449,103 | B1 | 9/2002 | Charles |
| 6,560,039 | B1 | 5/2003 | Webb |
| 8,096,654 | B2 | 1/2012 | Amirparviz |
| 8,134,778 | B2 | 3/2012 | Guyer |
| 8,571,789 | B2 | 10/2013 | Monde |
| 8,956,281 | B2 | 2/2015 | Wilson |
| 8,971,978 | B2 | 3/2015 | Ho |
| 9,063,352 | B2 | 6/2015 | Ford |
| 9,111,473 | B1 | 8/2015 | Ho |
| 9,134,534 | B2 | 9/2015 | Border |
| 9,251,745 | B2 | 2/2016 | Sprague |
| 9,933,604 | B1 | 4/2018 | Lu |
| 10,176,205 | B2 | 1/2019 | Alvey |
| 10,353,204 | B2 | 7/2019 | Miller |
| 11,604,355 | B2 * | 3/2023 | Lemoff .................. G02C 7/088 |
| 2002/0140906 | A1 | 10/2002 | Gibbon |
| 2004/0156132 | A1 | 8/2004 | Garcia |
| 2005/0180687 | A1 | 8/2005 | Amitai |
| 2006/0227067 | A1 | 10/2006 | Iwasaki |
| 2008/0266529 | A1 | 10/2008 | Dubin |
| 2009/0185135 | A1 | 7/2009 | Volk |
| 2009/0189830 | A1 | 7/2009 | Deering |
| 2010/0033561 | A1 | 2/2010 | Hersee |
| 2011/0176205 | A1 | 7/2011 | Shaw |
| 2011/0221658 | A1 | 9/2011 | Haddick |
| 2011/0221659 | A1 | 9/2011 | King, III |
| 2012/0120365 | A1 | 5/2012 | Legerton |
| 2013/0169932 | A1 | 7/2013 | Saito |
| 2013/0278631 | A1 | 10/2013 | Border |
| 2014/0098226 | A1 | 4/2014 | Pletcher |
| 2014/0118829 | A1 | 5/2014 | Ma |
| 2014/0204003 | A1 | 7/2014 | Deering |
| 2015/0301338 | A1 | 10/2015 | Van Heugten |
| 2015/0312560 | A1 | 10/2015 | Deering |
| 2016/0026253 | A1 | 1/2016 | Bradski |
| 2016/0097940 | A1 | 4/2016 | Sako |
| 2016/0150951 | A1 | 6/2016 | Du |
| 2016/0356995 | A1 | 12/2016 | Mouws |
| 2019/0353903 | A1 | 11/2019 | Lemoff |
| 2020/0018955 | A1 | 1/2020 | Lemoff |
| 2020/0301119 | A1 | 9/2020 | Lemoff |
| 2021/0223576 | A1 | 7/2021 | Lemoff |

OTHER PUBLICATIONS

All-Reflecting Two-Mirror Telescopes, (Aug. 3, 2016), URL: https://web.archive.org/web/20160803183105/http://www.telescope-optics.net/two-mirror.htm, (Dec. 14, 2017) (5 pages).
Avago Technologies, "ADNS-2620 Optical Mouse Sensor Data Sheet," Mar. 27, 2008, 27 pages.
International Search Report and Written Opinion for Application No. PCT/US19/39013, dated Aug. 29, 2019, 15 pages.
PCT International Search Report and Written Opinion, PCT Application No. PCT/US17/57240, dated Jan. 12, 2018, 23 pages.
Peifu, G., "Design and Preparation of Quarter-Wave Plate Coatings," National Air Intelligence Center, May 12, 1995, 16 pages.
Song et al "Baffles design for the axial two-mirror telescope", Optical Engineering, 2002, vol. 41, No. 9, pp. 2353-2357.
Tremblay, EJ, et al., "Ultrathin Cameras Using Annular Folded Optics," Applied Optics, Feb. 2007, vol. 46, No. 4. pp. 463-471.
International Search Report / Written Opinion in PCT/US2021/035787, dated Dec. 2, 2021.
International Search Report and Written Opinion in PCT/US 22/22334 dated Jul. 6, 2022.

\* cited by examiner

ADVANCED OPTICAL DESIGNS FOR IMAGING SYSTEMS

CROSS-REFERENCE TO RELATED APPLICATION(S)

This application is a continuation-in-part of U.S. patent application Ser. No. 16/895,077, "Advanced Optical Designs for Eye-mounted Imaging Systems," filed Jun. 8, 2020; which is a continuation-in-part of U.S. patent application Ser. No. 16/034,761 now U.S. Pat. No. 10,712,564, "Advanced Optical Designs for Eye-Mounted Imaging Systems," filed Jul. 13, 2018. The subject matter of all of the foregoing is incorporated herein by reference in its entirety.

BACKGROUND

1. Technical Field

This disclosure relates generally to imaging optics, for example as may be used with an eye-mounted imaging system.

2. Description of Related Art

Handheld cameras are ubiquitous. A large fraction of the world's population carries smartphones and most smartphones have one or more cameras. This allows people to document their lives and experiences. Pictures and videos of epic events, spectacular vacations and lifetime milestones are routinely captured by handheld cameras. At the other end of the spectrum, the number of selfies, cat videos and pictures of mediocre meals has also exploded in recent years.

Body-mounted cameras or body-cams go one step further. They automatically go where the user goes and can automatically record what the user is experiencing. Head-mounted or helmet-mounted cameras go even one step further. They automatically view what the user is viewing or, at least where he turns his head. They can record events from this point of view.

However, all of these imaging devices are separate pieces of equipment that are visible to others. They are also relatively large and are not carried on the user's eye.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

An eye-mounted device includes a contact lens and an embedded imaging device, which for convenience is referred to as a femtoimager because it is very small. The front aperture of the femtoimager faces away from the user's eye so that the image sensor in the femtoimager captures imagery of a user's external environment. In various embodiments, the femtoimager operates in a visible wavelength band, a non-visible wavelength band, or a combination of both.

The femtoimager optics has a folded optical path, which is advantageous for fitting the femtoimager into the limited space within the contact lens. In one design, the optics for the femtoimager is a two mirror design, with a concave primary mirror followed by a convex secondary mirror in the optical path from the front aperture to the image sensor. In some embodiments, the optical system includes a solid transparent substrate with the primary mirror formed on one face of the substrate and the secondary mirror formed on an opposing face of the substrate. The front aperture is annular and may be axially positioned between the two mirrors. It may include a lens or other refractive interface. Light blocking structures, light-redirecting structures, absorbing coatings and other types of baffle structures are used to reduce or eliminate extraneous light from reaching the image sensor.

The eye-mounted device may include other components in the contact lens: a projector that projects images onto the retina, other types of sensors, electronics, batteries, a coil to wirelessly receive power, or an antenna to transmit/receive data, for example. These components may be positioned in front of the pupil in the optical path of the eye. Some components must be positioned within this optical zone, for example in order to project images onto the retina. Other components may be positioned outside the optical zone. The femtoimager may be either within or outside the optical zone.

Figure 1A:
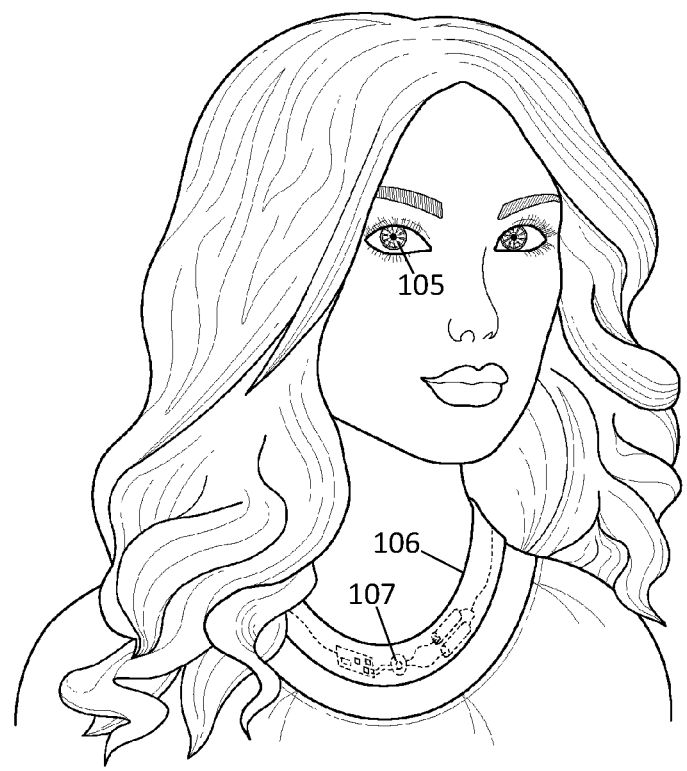
FIG. 1A shows a user wearing an eye-mounted device in communication with an auxiliary necklace.
Figure 1B:
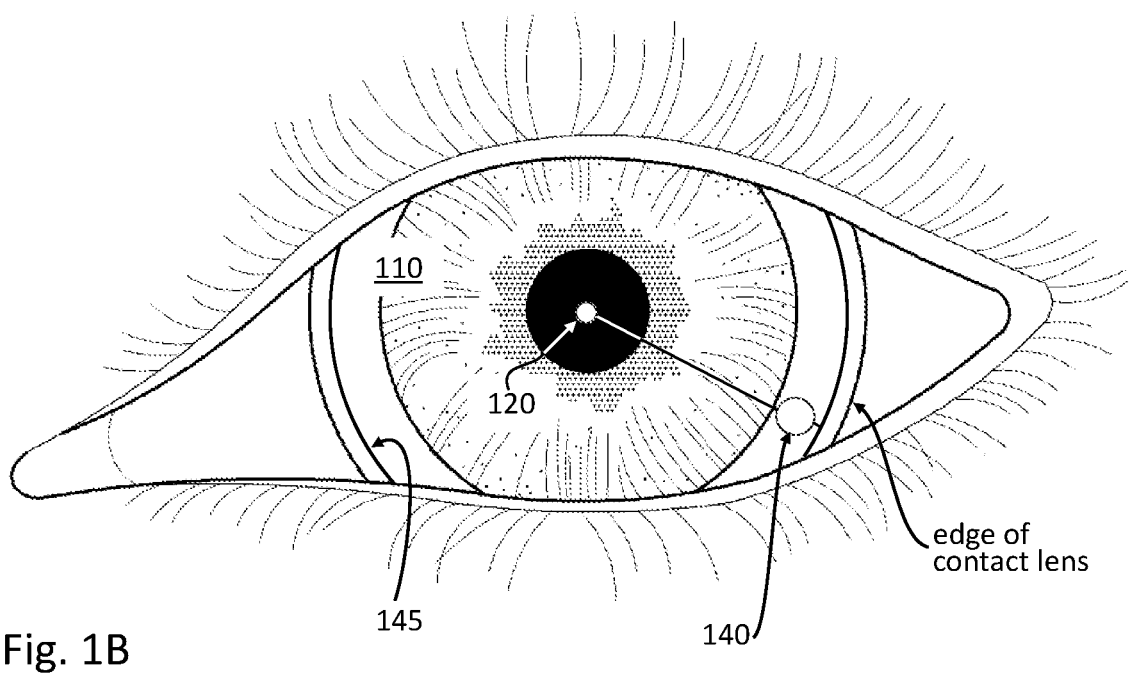
FIG. 1B shows a magnified view of the electronic contact lens mounted on the user's eye.

In more detail, FIG. 1A shows a user wearing an eye-mounted device 105 in communication with a necklace 106. FIG. 1B shows a magnified view of the user's eye and eye-mounted device. The eye-mounted device 105 includes a contact lens 110 that is worn on the surface of the eye. The following examples use a scleral contact lens but the contact lens does not have to be scleral. The contact lens 110 contains a femtoimager 120. The femtoimager 120 captures images of the external environment.

FIG. 1B shows a front view of the contact lens 110 mounted on a user's eye. The contact lens 110 is placed on the surface of the eye. The contact lens 110 moves with the user's eye as the user's eye rotates in its socket. Because the femtoimager 120 is mounted in the contact lens 110, it also moves with the user's eye. The ratio of the contact lens diameter to femtoimager lateral size is preferably roughly 15:1. This ratio is normally between about 15:1 and 30:1, but may be as small as 5:1 or smaller or as large as 50:1 or larger.

In this example, the contact lens 110 also contains electronics 140 and a coil (or antenna) 145. In some embodiments, the coil 145 is a power coil that receives power wirelessly, for example via magnetic induction. In other embodiments, the contact lens 110 includes a battery that supplies power to the femtoimager 120. The electronics 140 may be used to control the femtoimager, receive or process images from the femtoimager, provide power to the femtoimager, and/or transmit data to/from the femtoimager. The contact lens 110 may also include other components, such as a projector that projects images onto the user's retina (referred to as a femtoprojector).

FIG. 1A shows an implementation where, in addition to the eye-mounted device 105, the user is also wearing a necklace 106 that contains components of the eye-mounted system. In this example, the necklace 106 includes a wireless transceiver 107 that transmits/receives image data and/or transmits power to the eye-mounted device 105. Image transmission to/from an eye-mounted device is subject to data rate constraints due to size and power consumption limitations of electronics in a contact lens. Off-lens accessory devices may be used in place of, or in addition to, a necklace.

Figure 2:
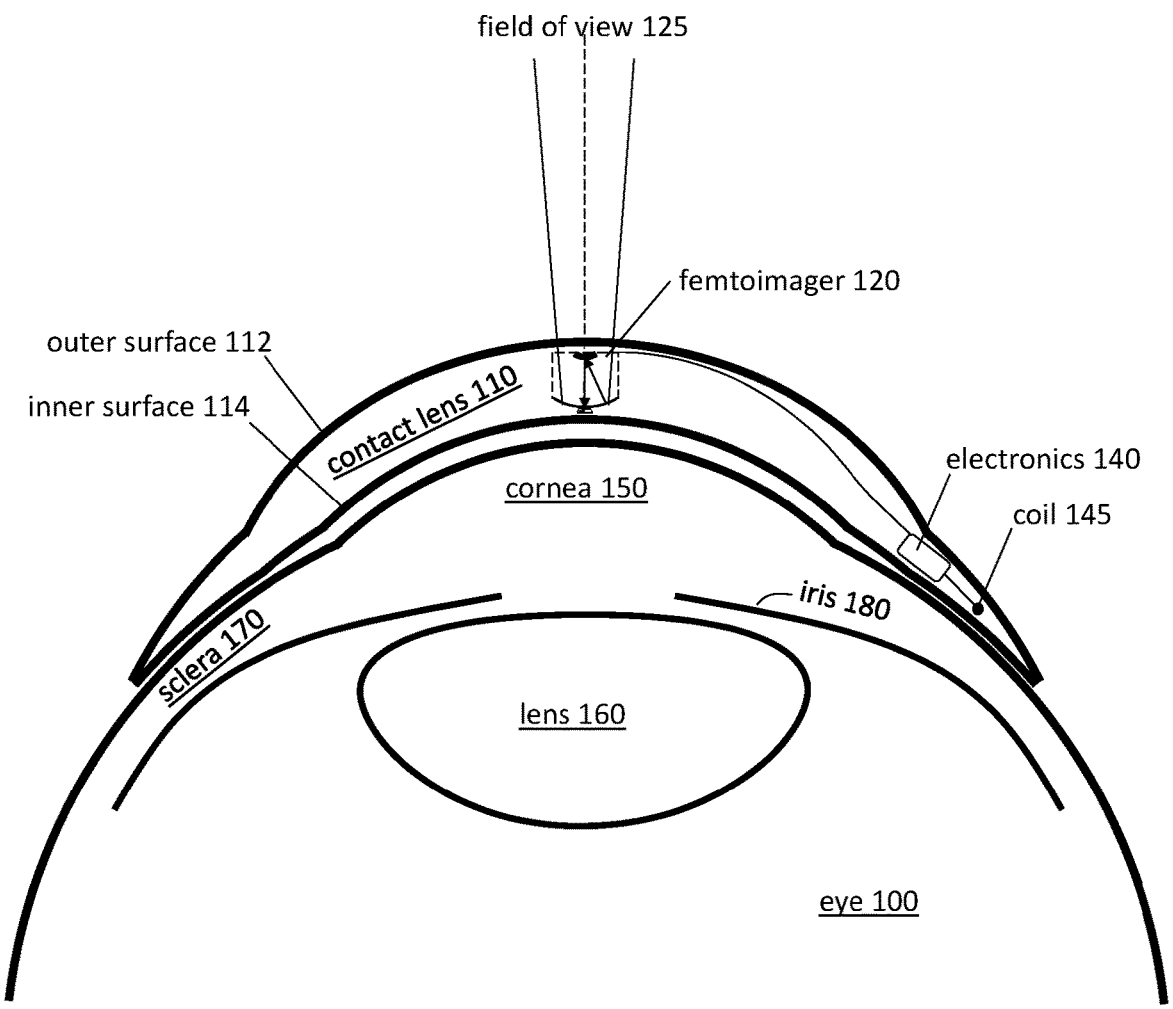
FIG. 2 shows a cross sectional view of an electronic contact lens with an embedded imaging device (femtoimager).

FIG. 2 shows a cross sectional view of the contact lens 110 with embedded femtoimager 120. FIG. 2 shows an embodiment using a scleral contact lens but the contact lens 110 does not have to be scleral. The contact lens 110 preferably has a thickness that is less than two mm. The femtoimager 120 preferably fits in a 1 mm×1 mm×1 mm volume, or at least within a 2 mm×2 mm×2 mm volume. The contact lens 110 is comfortable to wear and maintains eye health by permitting oxygen to reach the cornea 150.

For completeness, FIG. 2 shows some of the structure of the eye 100. The contact lens 110 is separated from the cornea 150 of the user's eye 100 by a tear layer. The aqueous of the eyeball is located between the cornea and the crystalline lens 160 of the eye 100. The vitreous fills most of the eyeball. The iris 180 limits the aperture of the eye.

The femtoimager 120 is outward-facing, meaning the femtoimager 120 "looks" away from the eye 100 and captures imagery of the surrounding environment. The field of view 125 of the femtoimager 110 may be the same, smaller or larger than a field of view of the user's eye. As shown in more detail below, the femtoimager 110 includes imaging optics (referred to as a femtoscope), a sensor array and sensor circuitry. The sensor array may be an array of photodiodes. In some embodiments, the sensor array operates in a visible wavelength band (i.e., ~390 nm to 770 nm). Alternatively or additionally, the sensor array operates in a non-visible wavelength band, such as an infrared (IR) band (i.e., ~750 nm to 10 µm) or an ultraviolet band (i.e., <390 nm). For example, the sensor array may be a thermal infrared sensor.

The sensor circuitry senses and conditions sensor signals produced by the sensor array. In some instances, the output signals produced by the sensor circuitry are analog signals. Alternatively, the sensor circuitry may include analog-to-digital converters (ADC), so that the output signals are digital rather than analog. The sensor circuitry may also have other functions. For example, the sensor circuitry may amplify the sensor signals, convert them from current to voltage signals or filter noise from the sensor signals to keep a signal-to-noise ratio below a threshold value. The sensor circuitry may be implemented as a separate electronics module 140. Alternatively, it may be implemented as a backplane to the sensor array. Processing of the images captured by the femtoimager may occur outside the contact lens 110.

FIGS. 3-4 show an example femtoimager design. FIGS. 3 and 4 show cross sectional views and perspective views, respectively, of a femtoimager. The femtoimager uses a femtoscope with two mirrors that direct incoming light to an image sensor 340. The femtoscope of FIG. 3 includes a solid, transparent substrate 310. The solid transparent substrate 310 may be made from plastic, glass or other transparent materials. The femtoscope also includes an annular concave primary mirror 360 and a convex secondary mirror 350. Either or both of these may be aspheric. The concave primary mirror 360 may be formed by coating an end of the substrate 310 with a reflective material such as a metal (e.g. aluminum or silver) or an engineered stack of dielectric layers. The shape of the primary mirror 360 may be made by any of several different techniques. For example, if the substrate is injection-molded plastic, then the shape of the primary mirror 360 follows the shape of the mold used. Alternatively, the shape of the primary mirror 360 may be made by diamond turning the substrate on a lathe. Or, the shape of the primary mirror 360 may be made by photolithography and etching steps. Gray scale photolithography may be used to etch a mirror surface profile, for example. Wafer scale optics techniques including embossing, compression molding and/or UV curing photosensitive polymers may also be used to form mirror profiles. Additive manufacturing or three-dimensional printing (e.g. via two-photon polymerization) techniques may also be employed. These techniques may also be used to form the secondary mirror 350.

The primary mirror 360 includes a clear, non-reflective back aperture 365 (also referred to as the output aperture). An image sensor 340, such as an array of photodiodes, is mounted at this location. Other types of image sensors include phototransistors, CCDs, pyrometer-based sensors, micro-bolometers, and sensors based on vanadium oxide, silicon, indium phosphide, gallium antimonide or gallium arsenide, for example.

The secondary mirror 350 faces the primary mirror 360, and the image sensor 340 faces the secondary mirror 350. Light rays enter the femtoscope through the front aperture 370 (also referred to as the input aperture). They are first incident on and reflected by the annular primary mirror 360. The reflected rays are then incident on and further reflected by the secondary mirror 350 before exiting through the back aperture 365 and reaching the image sensor 340. The primary mirror 360 and secondary mirror 350 cooperate to form an image of the external environment, which is captured by the image sensor 340.

The primary mirror 360 and secondary mirror 350 cooperate to image rays entering through the front aperture 370 onto the image sensor 340. However, not all light rays from the external environment are included in image formation. Those light rays that are used to form an image are referred to as image-forming rays. The remaining light rays are referred to as extraneous rays. In FIG. 3, the front aperture 370 is annular in shape (but not required to be planar). It is defined by an inner edge 372 and outer edge 374. The front aperture 370 limits which rays enter the optical system to form the image. In this design, the front aperture 370 is not axially aligned with either of the mirrors 350, 360. That is, the z-coordinate of the front aperture 370 is between that of the primary mirror 360 and the secondary mirror 350. In FIG. 3, the front aperture 370 is located approximately midway between the two mirrors 350, 360.

The system also includes a light baffle system to block or at least reduce extraneous light. In FIG. 3, the baffle system includes an inner baffle 382 which serves as a three-dimensional obscuration, and a side baffle with an external portion 384 and an internal portion 386. The baffles may be either an integral part of the femtoscope or a surrounding structure in which the optical system is mounted. Absorbing or black baffles may also make the femtoimager less visible to others. In one implementation, the obscuration 382 and internal side baffle 386 are made by depositing an absorbing material such as carbon, roughened or etched nickel ("nickel black"), black chrome, or Vantablack (Surrey NanoSystems, Newhaven, UK) on the transparent substrate 310, which serves as the core of the optical system. Black indium-tin oxide may also be used. The external side baffle 384 may be separate from the substrate 310, for example, it may be an absorbing material deposited on the sides of a hole into which the core is inserted during assembly.

In FIG. 3, the baffle system is designed to block all extraneous rays that would have a direct path from the external environment to the image sensor 340. Accordingly, the obscuration 382 extends an entire length between the secondary mirror 350 and the inner edge 372 of the front aperture. The external side baffle 384 extends from the outer edge 374 of the front aperture away from the primary mirror 360 and is sufficiently long to block all extraneous rays that would propagate through the front aperture 370 directly to the image sensor 340. Although not required in FIG. 3, it may be extended to an edge that is axially aligned with the secondary mirror 350 without adding length to the overall system. The internal side baffle 386 extends an entire length from the outer edge 374 of the front aperture to the primary mirror 360. In other embodiments, the baffle system may block less than all of the extraneous rays, so the baffles may be shorter.

Figure 3A:
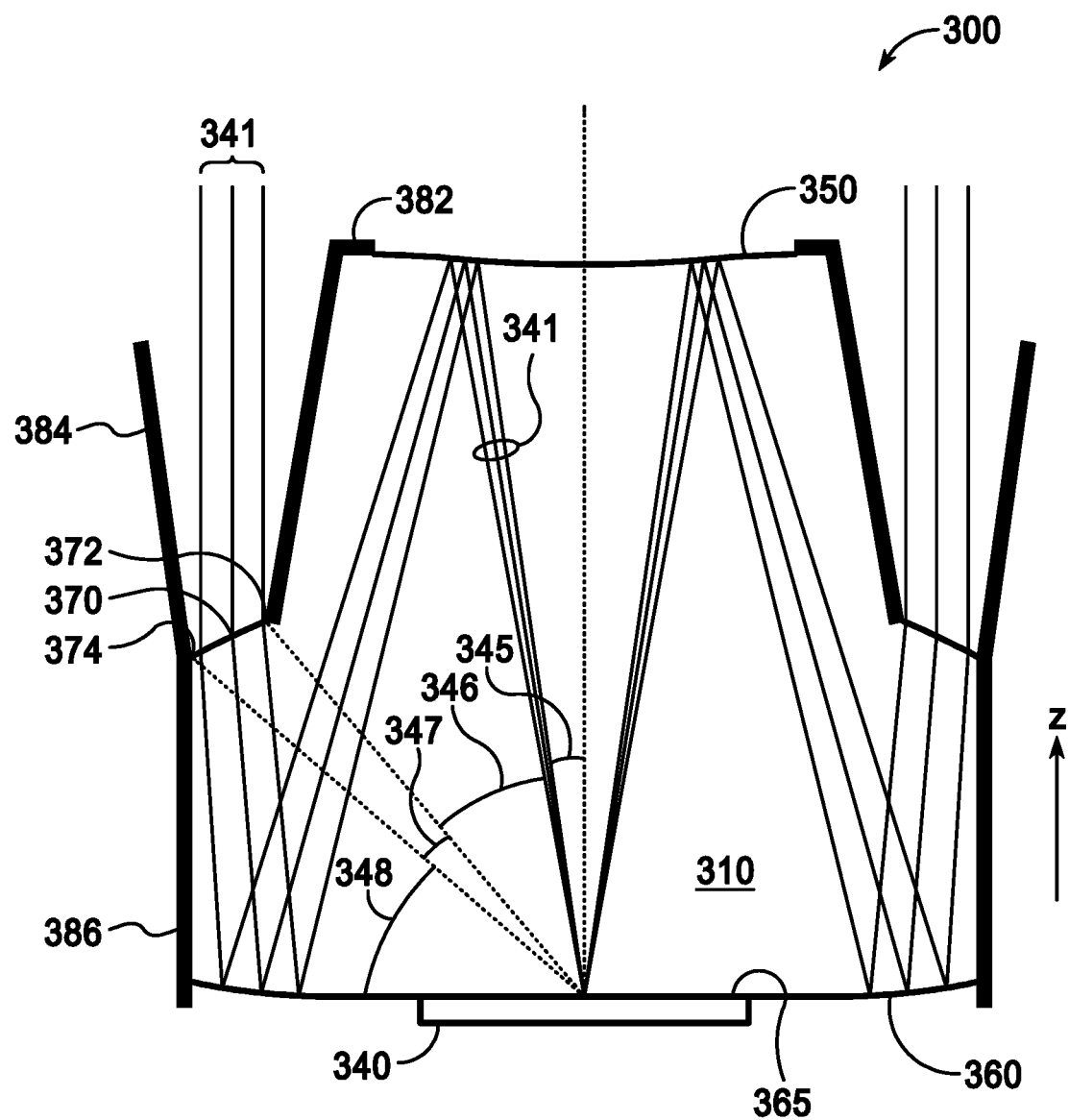
FIGS. 3A-3C show cross sectional views of a femtoimager optical system, with possible ray paths to the center, right edge and left edge of the image sensor, respectively.

FIG. 3A shows possible ray paths to the center point of the image sensor 340. These ray paths may be classified as follows. The bundle of rays 341 are reflected by the primary mirror 360 and the secondary mirror 350 to form the image on the image sensor 340. These are the image-forming rays 341. In FIG. 3A, the image-forming ray bundle 341 is labelled both as it enters through the front aperture 370 and as it propagates from the secondary mirror 350 to the image sensor 340.

The remaining paths are possible paths for extraneous rays, which are managed as follows. Extraneous rays that might have propagated along the ray paths in bundle 345 to the image sensor 340 are blocked by the back side of the secondary mirror 350. Extraneous rays are prevented from reaching the possible ray paths in bundle 346 (between the solid ray and the dashed ray) by the obscuration 382 and secondary mirror 350. Extraneous rays are prevented from reaching the possible ray paths in bundle 347 (between two dashed rays) by the external side baffle 384. The possible ray paths in bundle 348 are blocked by the internal side baffle 386. For clarity, only the lefthand rays are marked in FIG. 3A, but a similar situation exists for the righthand rays. Similar diagrams may also be produced for other points on the image sensor 340.

Figure 3B:
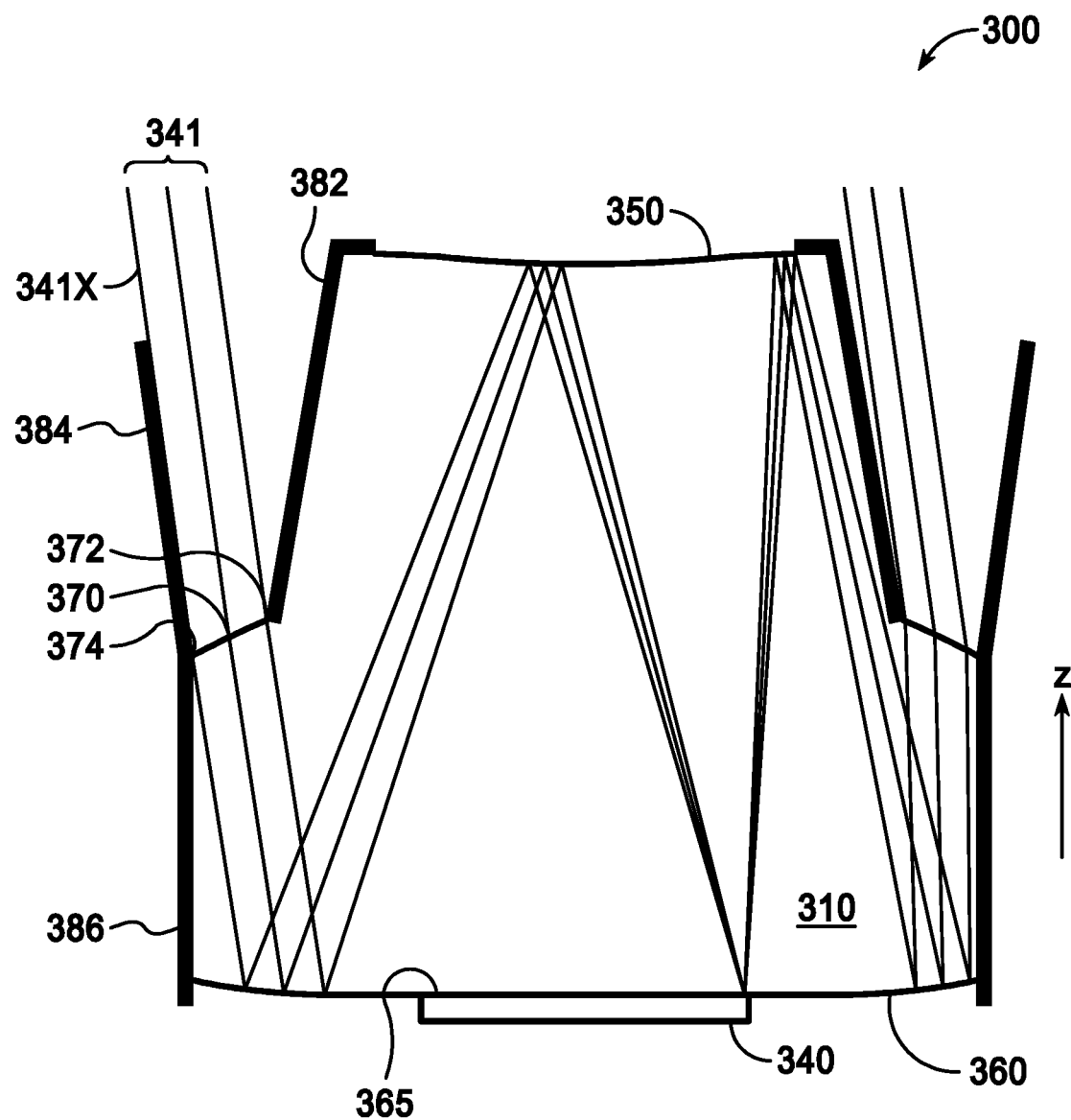
Figure 3C:
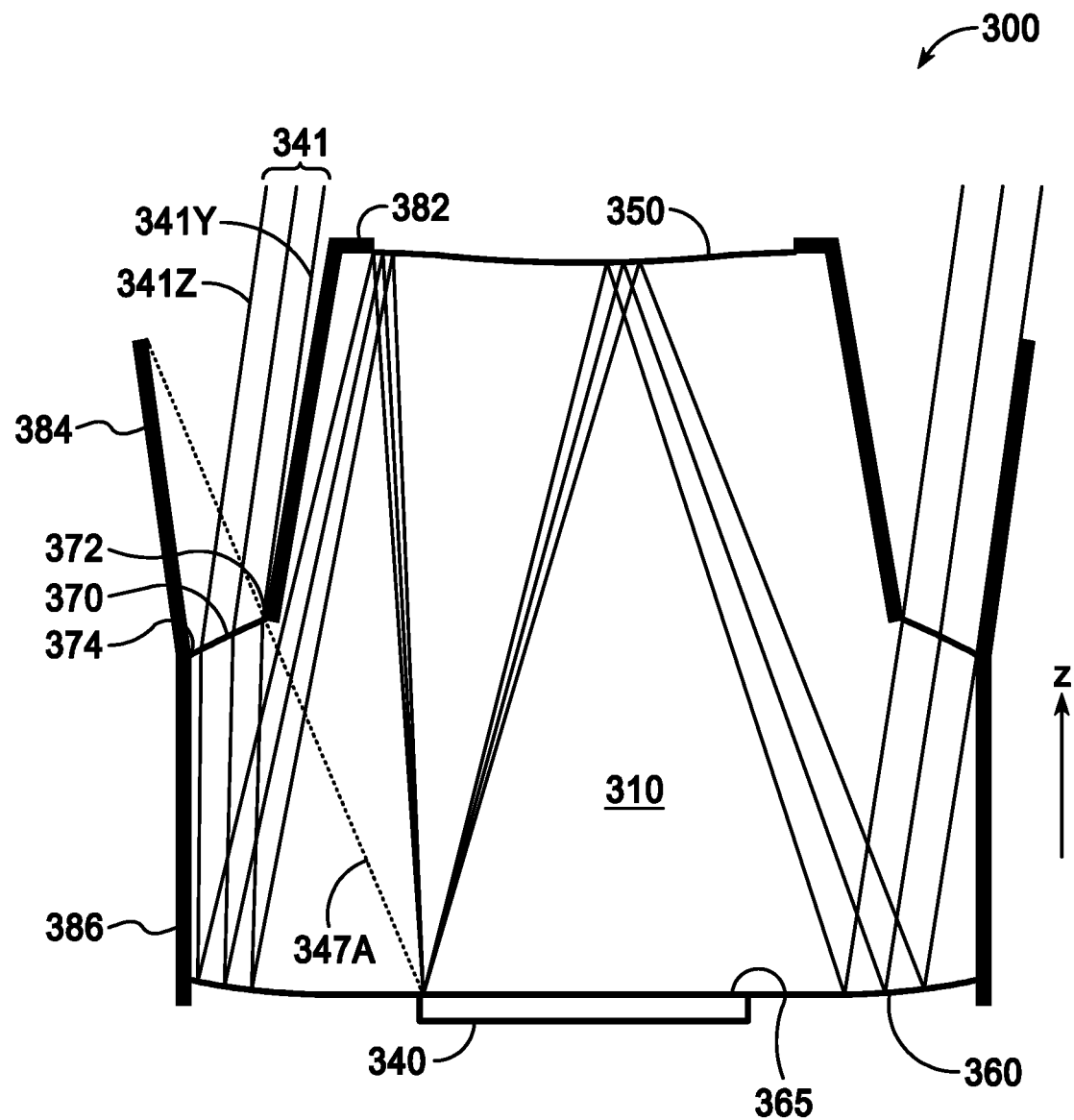

FIGS. 3B and 3C show possible ray paths to the two edge points of the image sensor 340. The extraneous rays are managed in a similar fashion as described in FIG. 3A. The edge points of FIGS. 3B and 3C also lead to the following considerations. Again, consider only the lefthand rays. In FIG. 3B, the external side baffle 384 is tapered outwards (or otherwise shaped) from the outer edge 374 of the front aperture so that it does not block the outermost image-forming ray 341X. Ray 341X passes through the outer edge 374 of the front aperture and is incident on the farthest point of the image sensor 340. As a result, it is propagating at the outermost angle of all image-forming rays. If external side baffle 384 does not block ray 341X, it also will not block any of the other image-forming rays. In addition, as shown in FIG. 3C, the external side baffle 384 is long enough to prevent extraneous rays from reaching ray path 347A. Because ray path 347A passes through the inner edge 372 of the front aperture to the outermost edge of the image sensor 340, it will intersect the side baffle 384 at the farthest possible axial distance from the image sensor 340.

Also in FIG. 3C, the obstruction 382 and internal side baffle 386 are shaped so that they do not block either image-forming ray 341Y or 341Z. Ray 341Y passes through the inner edge 372 of the front aperture and is incident on the nearest point on the image sensor 340. As a result, it is propagating at the innermost angle of all image-forming rays. If obstruction 382 does not block ray 341Y, it also will not block any of the other image-forming rays. In FIG. 3, the three-dimensional obstruction 382 is the combination of an annulus next to the secondary mirror 350 plus a conical frustum that extends the entire length between the annulus and the inner edge 372 of the front aperture.

Figure 4A:
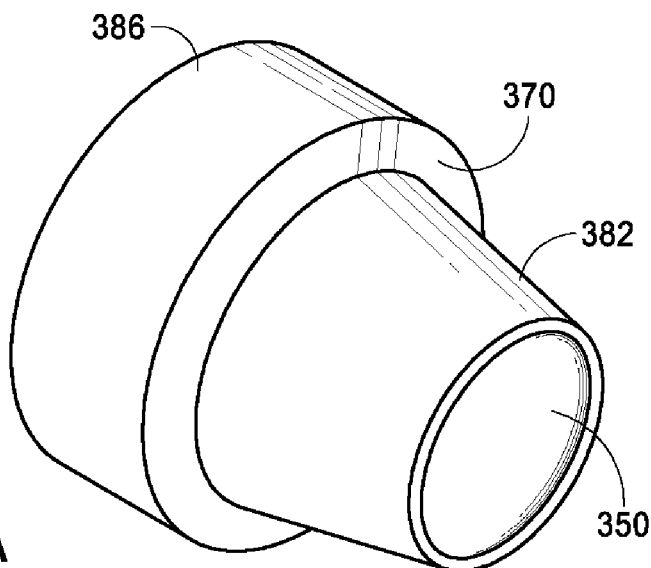
FIGS. 4A and 4B show perspective views of a femtoimager optical system.
Figure 4B:
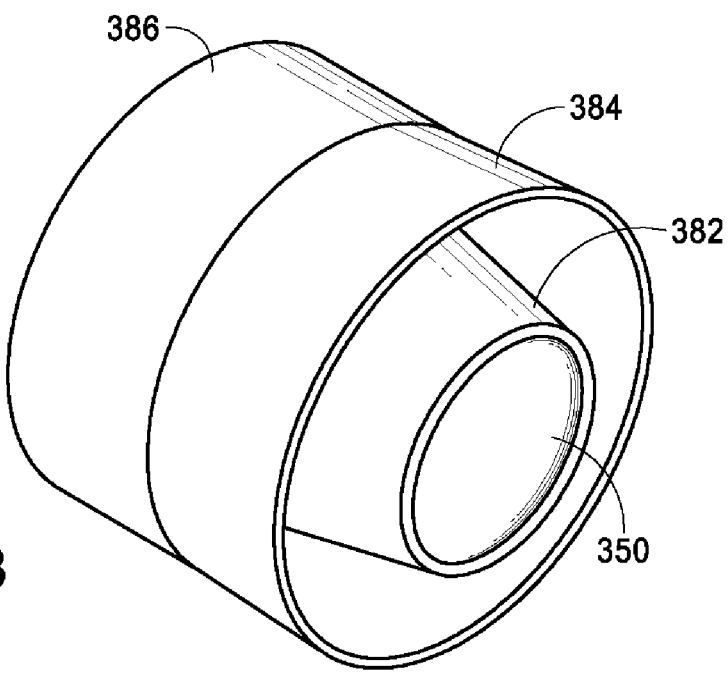

FIGS. 4A-4B show perspective views of the femtoscope from FIG. 3. FIG. 4A shows just the coated substrate 310. The internal side baffle 386 is cylindrical in shape (i.e., the sides are parallel to the optical axis of the system). The obstruction 382 is a frustum plus a narrow annulus, which is adjacent to the secondary mirror 350. The front aperture 370 is the transparent annulus between the internal side baffle 386 and three-dimensional obstruction 382. In some designs, the front aperture 370 has an axial location that is closer to midway between the primary and secondary mirrors, than to either the primary mirror 360 or the secondary mirror 350. For example, if z is the axial dimension and the two mirrors are located at z=0 mm and z=1 mm, then the front aperture is located in the range 0.25 mm<z<0.75 mm. The primary mirror and the back aperture for the image sensor are on the back face of the substrate, which is not visible in FIG. 4A. FIG. 4B also shows the external side baffle 384.

As noted above, the design in FIGS. 3-4 blocks all extraneous rays that would propagate directly to the image sensor 340. However, this is not strictly required. The different baffles 382, 384, 386 do not have to extend the entire lengths shown. They may be shorter in some designs. For example, the obstruction 382 may occupy some of the space between the secondary mirror 350 and the inner edge 372 of the front aperture, but without extending that entire length. It may extend from the secondary mirror 350 towards the primary mirror 360 but without reaching the inner edge 372 of the front aperture. Similarly, the external side baffle 384 may extend from the outer edge 374 of the front aperture, but may not be long enough to block all direct ray paths through the front aperture 370 to the image sensor 340. The same is true for the internal side baffle 386. In some cases, there may not be an internal side baffle 386 if the oblique extraneous rays are weak or managed by another mechanism.

The baffles 382, 384, 386 also do not have to have the shapes shown. For example, any absorbing structure that extends from the edge of the secondary mirror 350 to the inner edge 372 of the front aperture without blocking the image-forming rays 341 shown in FIG. 3C may serve the same purpose as the obstruction 382 with the shape shown in FIG. 3. Different shapes may have advantages in manufacturing or assembly.

As a final set of variations, FIGS. 3B-3C show some situations where certain image-forming rays 341 should not be blocked by the baffles. However, this is not strictly required. Blocking some of the image-forming rays 341 may be acceptable in some designs.

The design of femtoimagers is complicated by constraints such as the very small volume in which the system must fit, refractive indices of the substrate and the surrounding contact lens material, and required optical magnification specifications. The size and curvature of the primary and secondary mirrors, the size of the image sensor, and the indices of refraction are all examples of parameters that may be adjusted by an optical designer to optimize different design priorities such as optical throughput, depth of focus, field of view, magnification and resolution.

In some designs, the image sensor 340 is not more than 500 microns wide. For example, the image sensor 340 may be a 500×500 array of sensors, with a sensor-to-sensor pitch of not more than 3 microns and preferably not more than 1 micron. A 500×500 array with 1 micron pitch is approximately 500 microns on a side. An array with 500×500 color pixels using a Bayer pattern is less than 1 mm on a side using 1 micron pitch individual sensors (with three or more individual sensors per color pixel). Image sensors may be other sizes. For example, infrared sensors may be significantly larger. Sensor-to-sensor pitches of 10, 20 or even 40 microns are possible.

Some designs may have a narrow field of view, such as 2 degrees or less. The two-mirror design shown in FIGS. 3-4 is suited for narrower fields of view (for example, in the range of 5 to 15 degrees) and correspondingly higher resolutions. Larger and smaller fields of view are also possible with the two-mirror design.

The specific design of the femtoimager depends on the application. For non-imaging applications, the actual resolution may be lower than used for imaging applications. For example, a femtoimager with a small number (e.g., 10×10 array) of relatively large pixels may be used as a sensor for eye tracking applications. The femtoimager may view a far-away object, or a closer reference object such as the user's nose.

The design shown in FIGS. 3-4 utilizes a folded optical path. As a result, the optics have an optical path that is longer than the thickness of the contact lens. This may result in lower aberrations and higher angular resolutions. The optical path allows the image sensor to be oriented approximately parallel to, rather than perpendicular to, the contact lens surfaces. The femtoimager may occupy not more than 1 to 2 mm of vertical space (i.e., contact lens thickness) and/or the femtoimager may have a lateral footprint of not more than 2 to 4 mm$^2$. The front aperture may have a maximum lateral dimension of not more than 1 to 2 mm.

Figure 5:
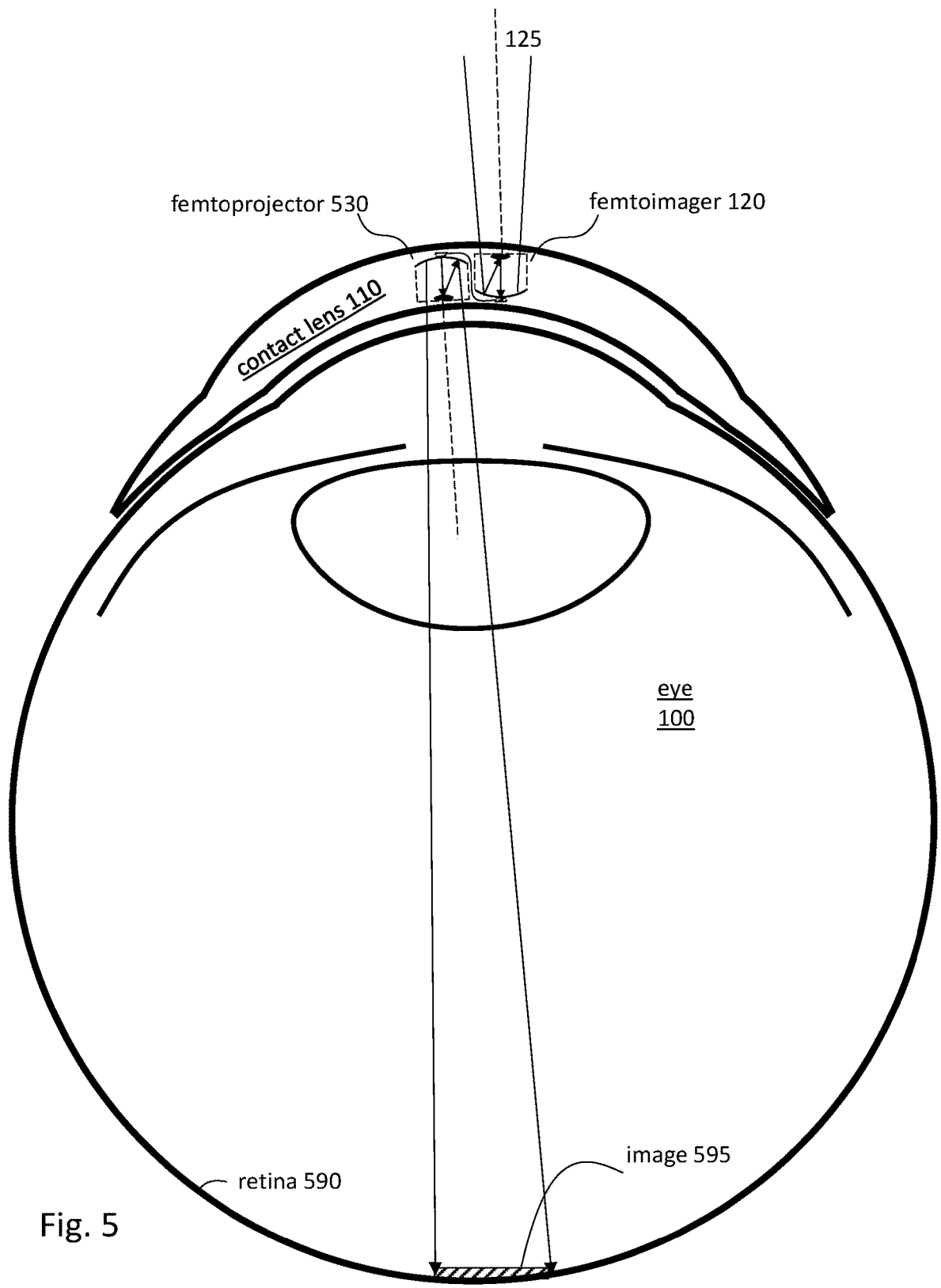
FIG. 5 shows a cross sectional view of an eye-mounted device with a femtoimager and a femtoprojector.

In addition to capturing images of the external environment or providing eye tracking functionality, femtoimagers may also be used for other applications in different types of eye-mounted devices. For example, FIG. 5 shows a cross sectional view of an eye-mounted device with a femtoimager 120 and a femtoprojector 530 (i.e., a small projector also contained in the contact lens 110). The femtoimager 120 captures images within its field of view 125. The femtoprojector 530 projects images 595 onto the retina 590 of the user. These two may be coordinated so that the images captured by the femtoimager are used to determine the images 595 projected by the femtoprojector 530.

FIGS. 6-12 show additional variations of the femtoscope of FIG. 3. These variations involve internal refractive interfaces, obscuration position and shape, and other parameters. The design choices are necessarily illustrated in combinations and, to keep the number of figures under control, not every possible combination is shown. For example, the choice of shape of internal refractive interface is largely independent of the choice of obscuration location or obscuration shape. Some combinations of those choices are illustrated. Those skilled in the art will appreciate that other, unillustrated combinations may be desirable in certain situations.

Figure 6:
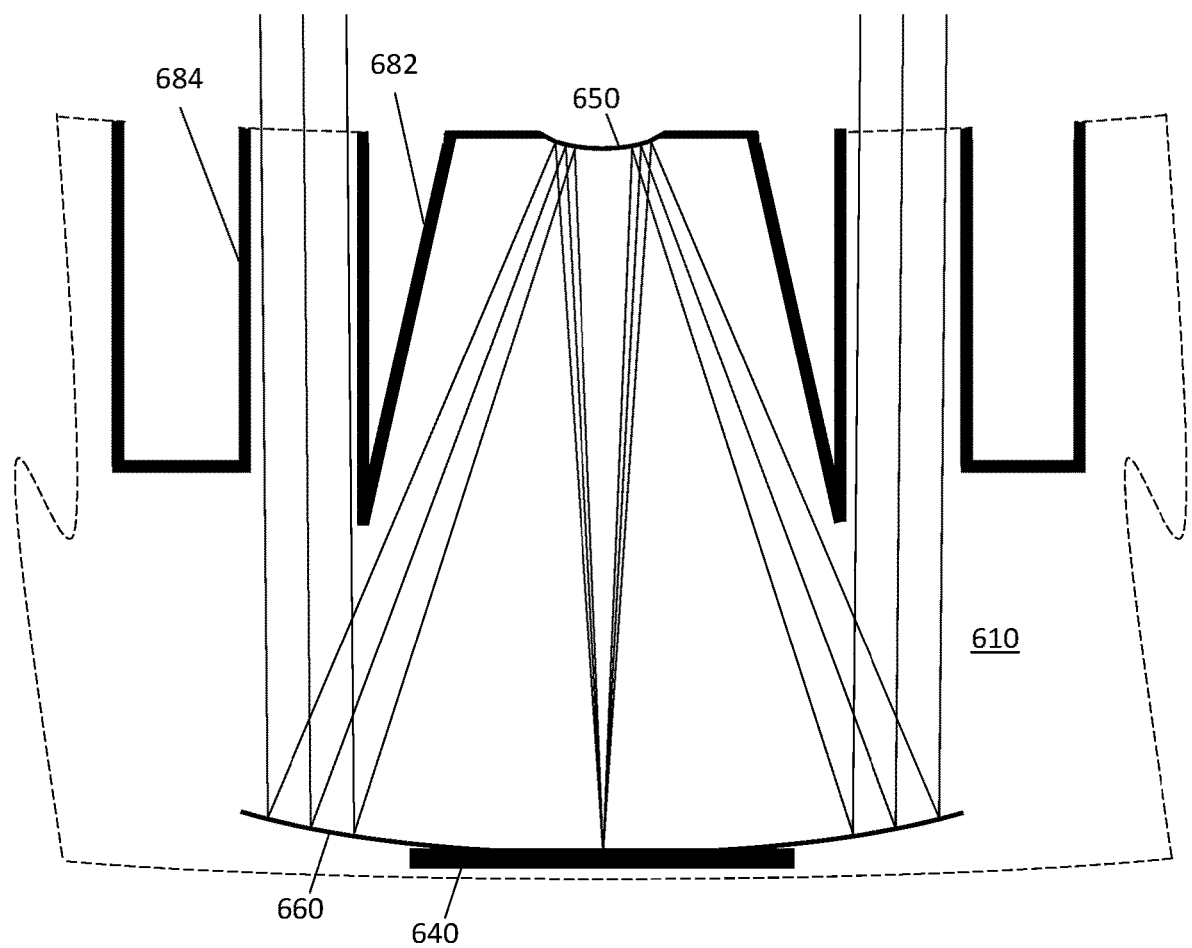
FIG. 6 shows a cross sectional view of another femtoimager optical system.

The design of FIG. 6 is also based on a transparent substrate 610, with the image sensor 640 and primary mirror 660 on one face and the secondary mirror 650 on an opposing face. However, the three-dimensional obscuration 682 is formed by creating a groove in the core material and then coating the interior of the groove with an absorbing material. A partial side baffle 684 is similarly created.

Figure 7:
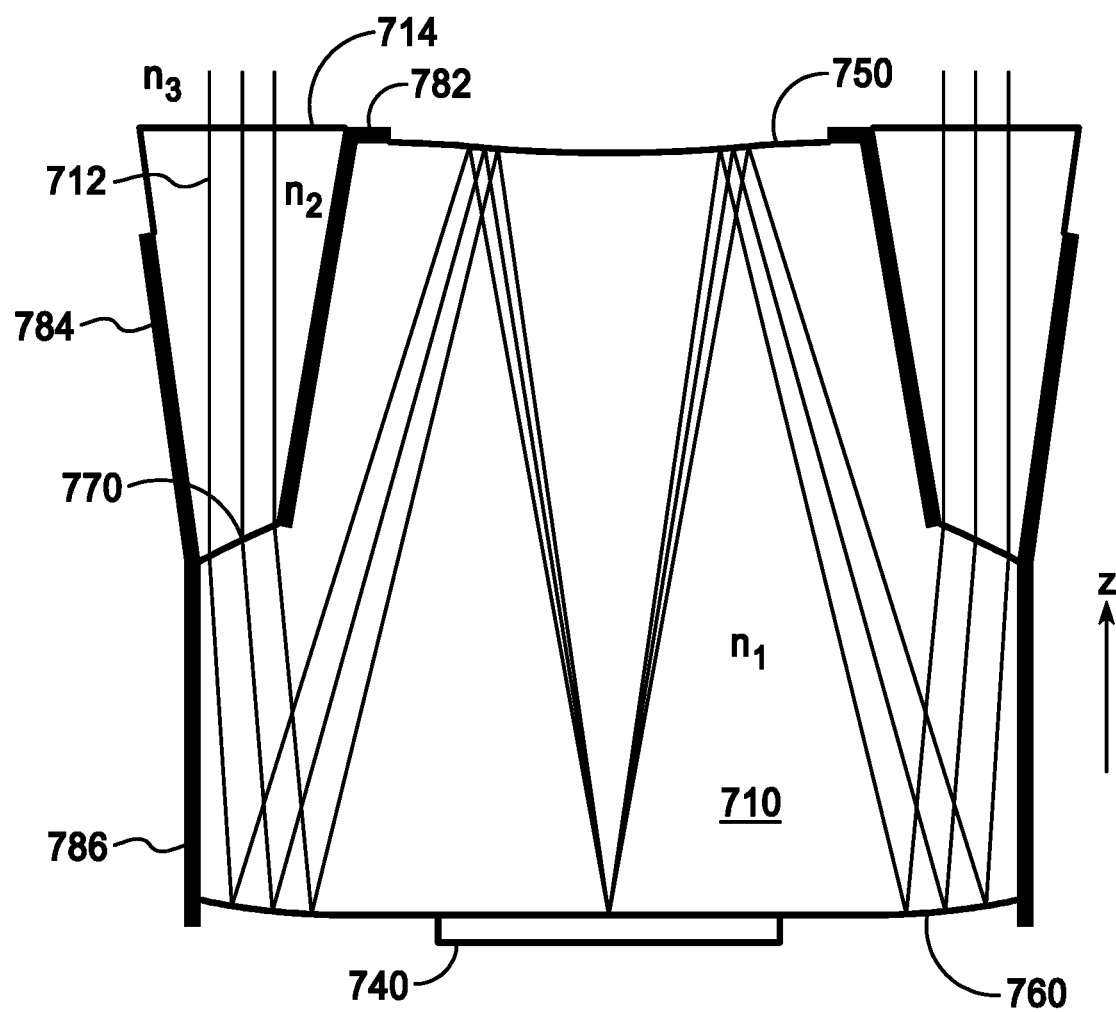
FIG. 7 shows a cross sectional view of yet another femtoimager optical system.

The design of FIG. 7 includes a planarization fill 712. If the core material 710 has refractive index $n_1$, the fill material 712 has a different refractive index $n_2$, and the surrounding material (e.g., the contact lens material) has refractive index $n_3$, then there are two refractive interfaces. The first is at the exit aperture 770. The second refractive interface 714 is between the fill material 712 and the surrounding material. These refractive interfaces may be shaped to achieve various optical functions, for example introducing optical power or correcting optical aberrations. The other numbered elements in FIG. 7 are the same as the numbered counterparts in FIG. 3: image sensor 740, convex secondary mirror 750, concave primary mirror 760, inner baffle 782, side baffle external portion 784 and side baffle internal portion 786.

Figure 8:
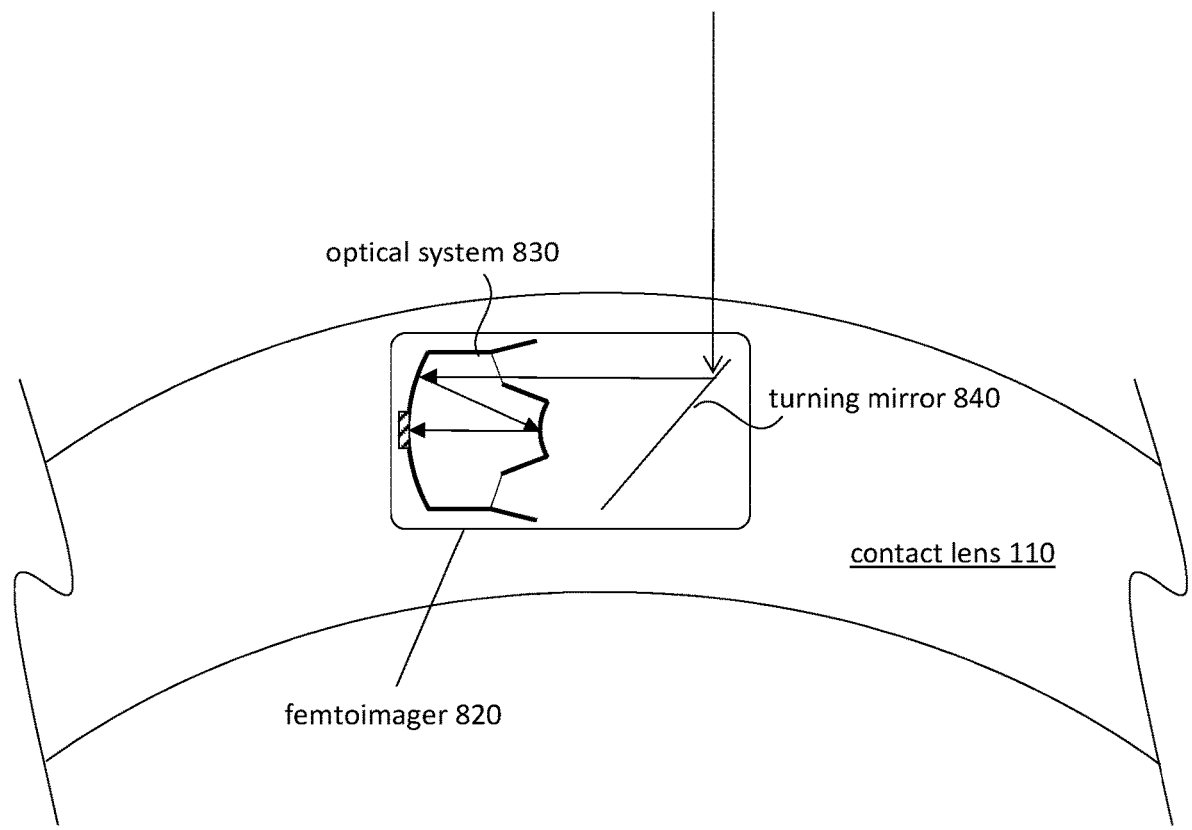
FIG. 8 shows a cross sectional view of a horizontally positioned femtoimager in a contact lens.

In FIG. 2, a femtoimager is shown mounted in a contact lens in a "vertical" configuration. The optical axis and/or axis of symmetry of the femtoimager 120 is approximately perpendicular to the outer surface of the contact lens 110. In FIG. 8, the femtoimager 820 is mounted in a "horizontal" configuration. The optical axis and/or axis of symmetry of the femtoimager optical system 830 is approximately parallel to the outer surface of the contact lens 110. In this configuration, a turning mirror 840 directs image rays from the external environment to the femtoimager optical system 830.

Figure 9:
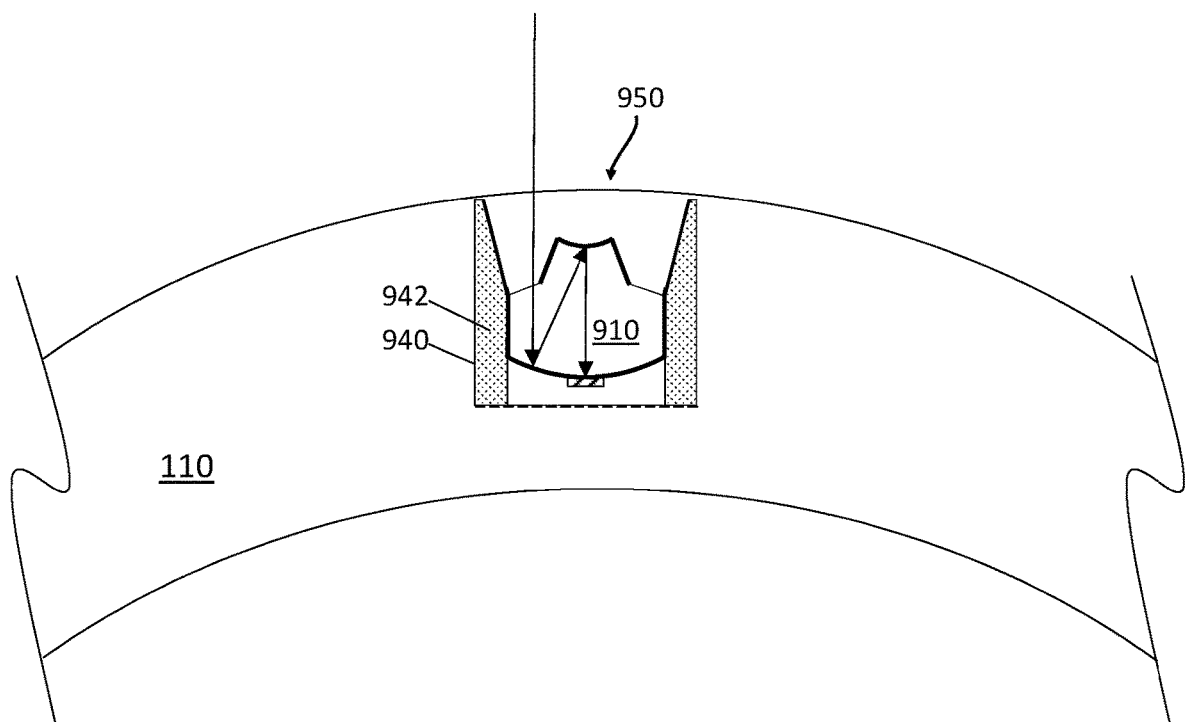
FIG. 9 shows a cross sectional view of yet another femtoimager in a contact lens.

FIG. 9 shows a cross sectional view of yet another femtoimager in a contact lens 110. The assembly of FIG. 9 has the following structure. A cavity 950 is formed in the contact lens 110 and the solid core 910 shown in FIG. 4A is inserted into the cavity 950. In this example, the cavity 950 tapers inwards from the outer surface of the contact lens and then has straight sidewalls where it contacts the core 910. The sidewalls of the cavity 950 are absorbing. This may be achieved by coating the sidewalls of the cavity. Alternatively, a larger hole 940 may first be formed and filled with dark colored epoxy 942 (Master Bond EP42HT-2MED Black, for example). The cavity 950 is then formed in the epoxy. The remaining dark colored epoxy 942 serves as the absorbing side baffle for the femtoimager. Materials other than epoxy may be used. Its sides may be coated instead, for example.

Figure 10A:
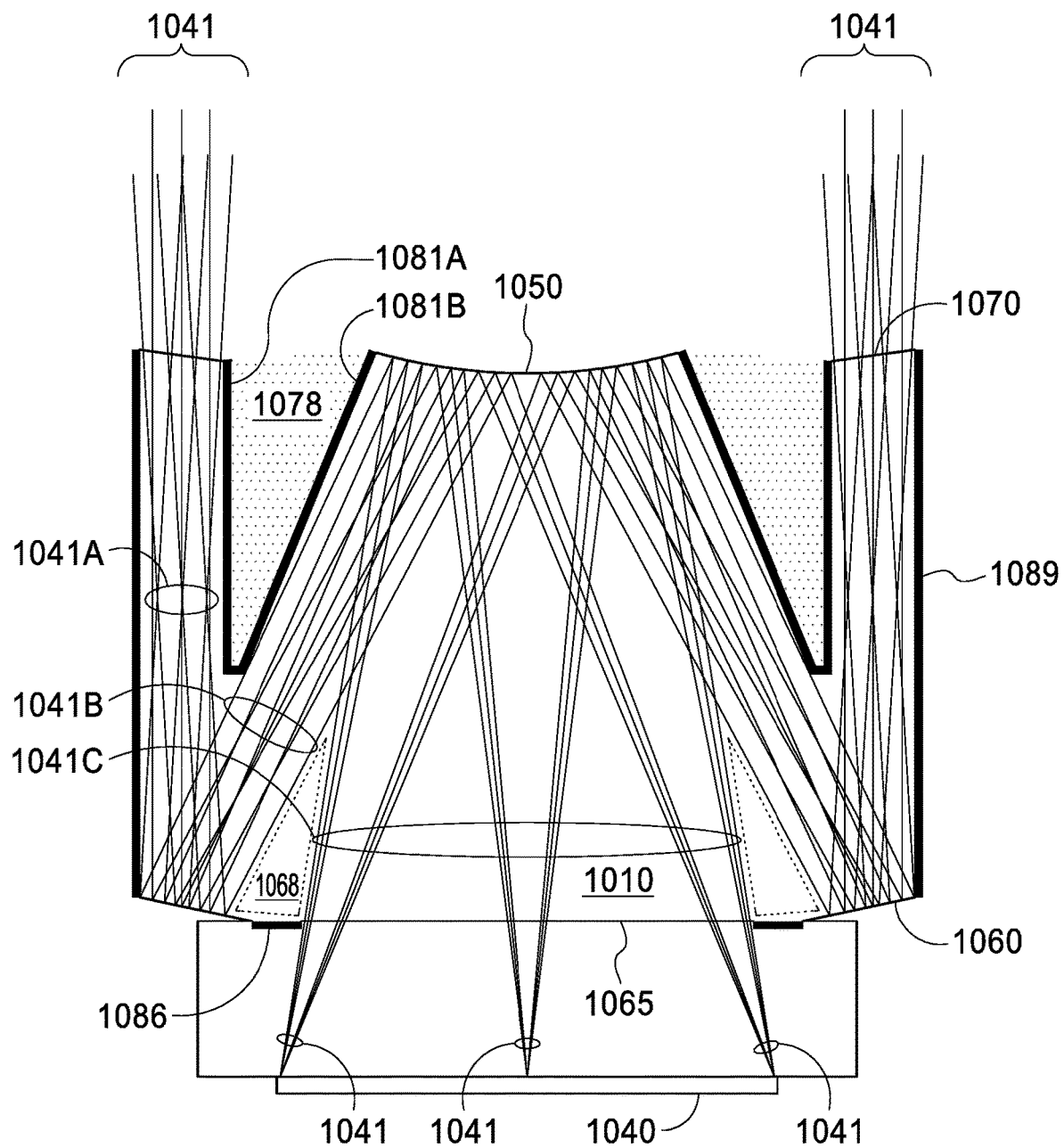
FIG. 10A shows a cross-sectional view of yet another femtoimager, with possible ray paths to the left edge, center and right edge of the image sensor.

FIG. 10A shows a cross-sectional view of yet another femtoimager, with ray paths to the left edge, center and right edge of the image sensor. FIG. 10A is drawn to scale and the femtoscope is approximately 0.7 mm in diameter. In this example, the femtoscope includes a solid, transparent substrate 1010 with an annular input aperture 1070 and an output aperture 1065. The input aperture 1070 is approximately axially aligned with the convex secondary mirror 1050, and the output aperture 1065 is approximately axially aligned with the concave primary mirror 1060. The input aperture 1070 may form a refractive interface and it may be curved or otherwise shaped to improve the imaging performance. The input aperture 1070 and mirrors 1050, 1060 may be aspheric. In this example, the image sensor 1040 is slightly separated from the output aperture 1065. Here, the spacing (shown as a rectangle in FIG. 10A) is a glue layer to attach the image sensor 1040 to the output aperture 1065.

FIG. 10A shows the ray paths for image-forming rays 1041 from the input aperture 1070 to the image sensor 1040, for rays incident on the left edge, center and right edge of the image sensor. Image-forming rays from the input aperture to other locations on the image sensor will fall within the boundaries defined by the rays shown in FIG. 10A. The aggregate of all image-forming rays may be divided into three ray bundles: a first bundle 1041A of image-forming rays propagating from the input aperture 1070 to the primary mirror 1060, a second ray bundle 1041B propagating from the primary mirror 1060 to the secondary mirror 1050, and a third ray bundle 1041C propagating from the secondary mirror 1050 to the output aperture 1065 (and then on to the image sensor 1040).

In FIG. 10A, there are two spaces between these image-forming ray bundles. One space 1078, which will be referred to as the input interspace, is located between the first and second ray bundles 1041A and 1041B. In FIG. 10A, the input interspace 1078 is stippled because it is empty space. There is no material in the input interspace 1078. The other space 1068, which will be referred to as the output interspace, is located between the second and third ray bundles 1041B and 1041C. The output interspace 1068 is indicated by the dotted triangle in FIG. 10A. The interior of the triangle is not patterned because the output interspace is filled with the substrate material. Baffles may be positioned in these two interspaces to control extraneous rays without interfering with image-forming rays. For convenience, these will be referred to as the input baffle and output baffle, respectively. In the example of FIG. 10A, the input baffle is a groove in the solid substrate 1010 with two absorbing surfaces: outer surface 1081A which is adjacent to the first ray bundle 1041A, and inner surface 1081B which is adjacent to the second ray bundle 1041B. The output baffle 1086 is a flat absorbing ring in this example. It is positioned in the output interspace 1068, but does not extend into the interspace as a groove would. The femtoscope design also includes a side baffle 1089.

Figure 10B:
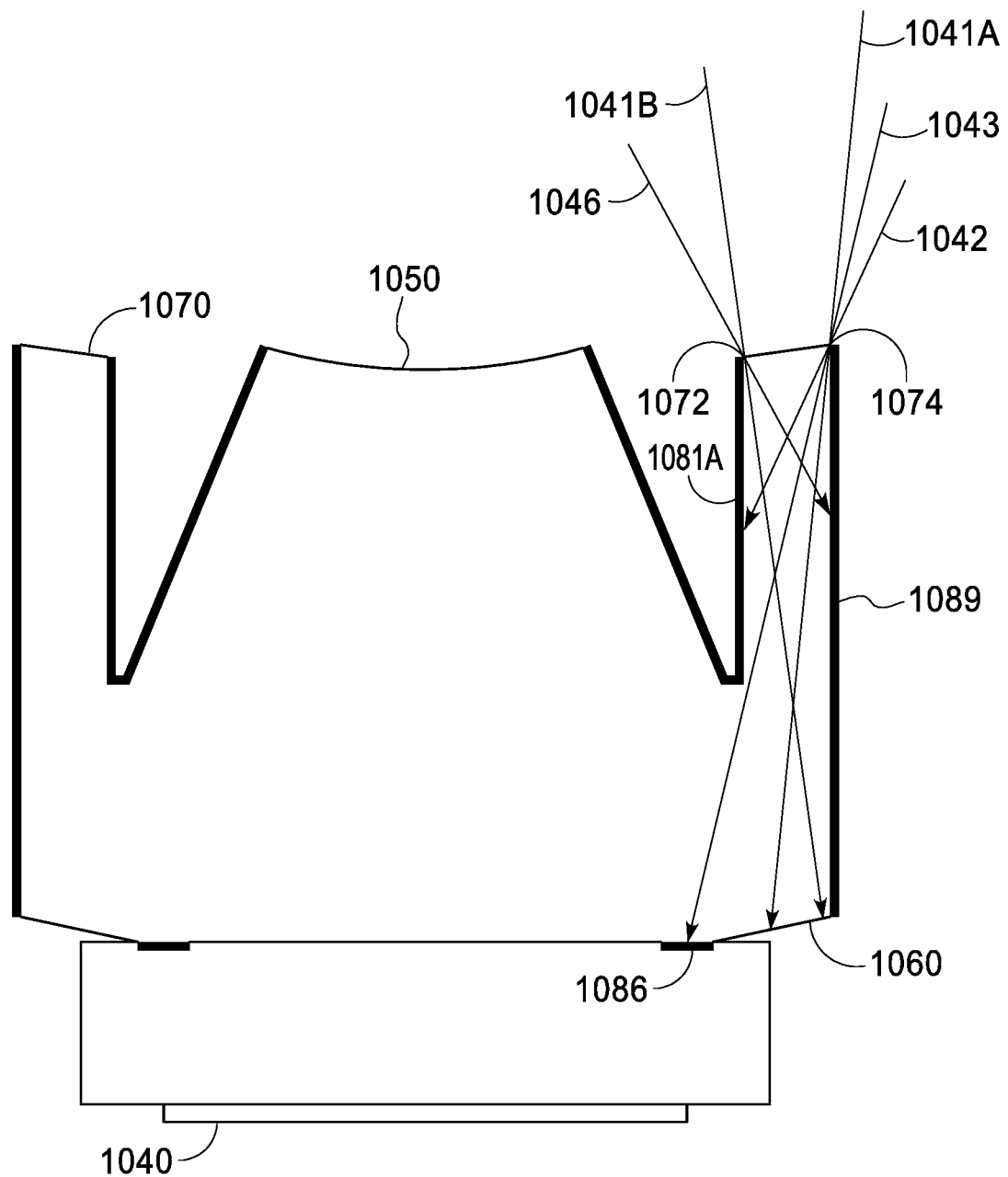
FIG. 10B shows extraneous rays blocked by baffles in the femtoscope of FIG. 10A.

FIG. 10B shows operation of the baffle system in blocking extraneous rays. The femtoimager has a field of view and rays within the field of view are imaged onto the image sensor 1040. Rays outside the field of view that enter the input aperture 1070 are blocked by the baffles.

Consider first the rays that enter the input aperture 1070 at the outer edge 1074. Refraction at the input aperture is ignored in FIG. 10B for purposes of illustration. Rays in the bundle 1042 are outside the field of view of the femtoimager, and these rays are blocked by the outer surface 1081A of the input baffle. Rays in bundle 1043 are also outside the field of view and are blocked by the output baffle 1086. Bundle 1041A contains the image-forming rays. Now consider the other extreme of rays entering the input aperture 1070 at the inner edge 1072. Ray bundle 1046 is blocked by the side baffle 1089. Rays in bundle 1041B are the image-forming rays. FIG. 10B shows rays in the plane of the cross-section. For a femtoscope design that is axially symmetric, skew rays will behave similarly by applying the above analysis to the radial component of each skew ray. Note that all extraneous rays that would have a direct path from the input aperture 1070 to the image sensor 1040 are blocked by either the input baffle 1081A or the output baffle 1086.

Figure 11A:
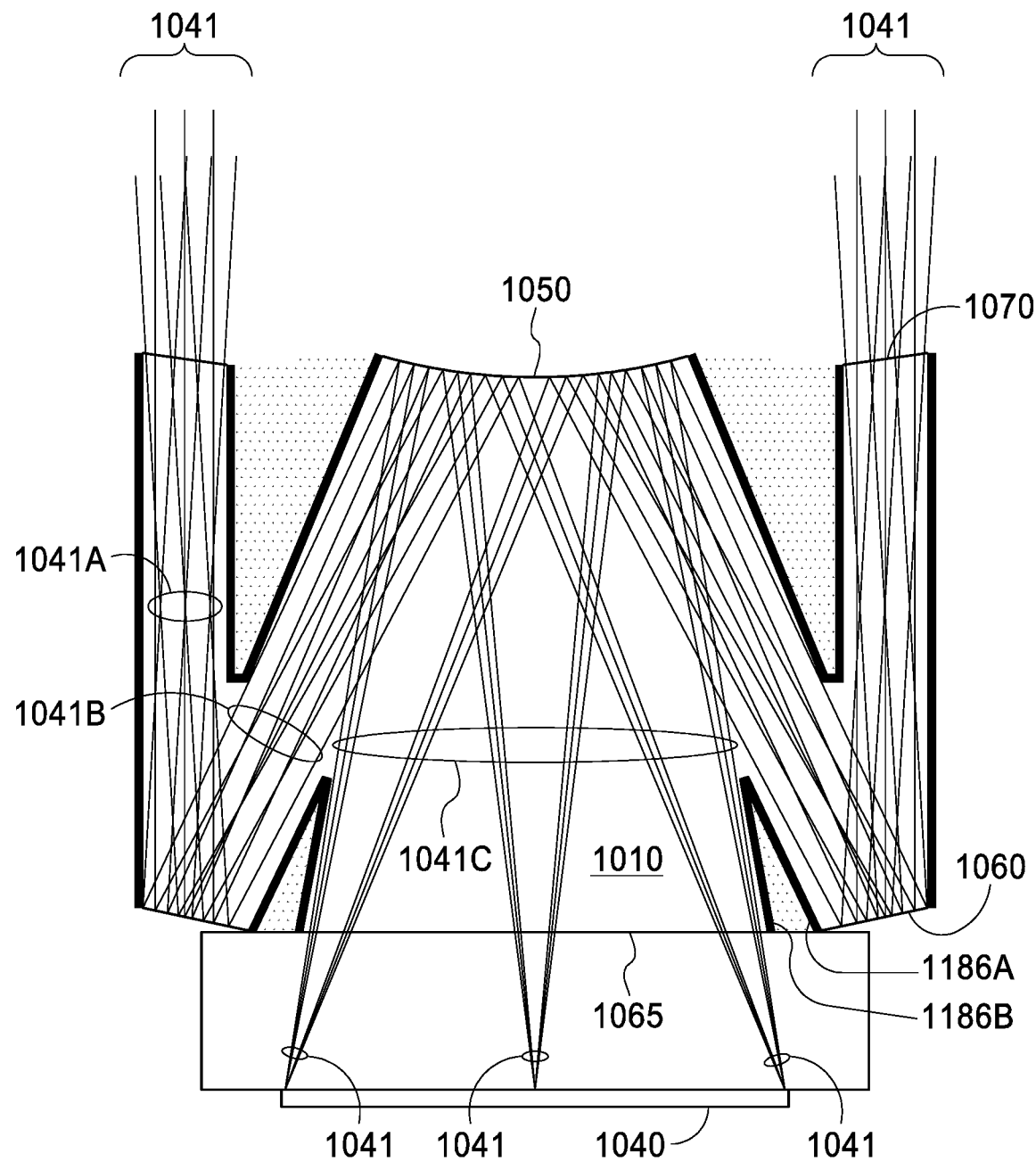
FIG. 11A shows a cross-sectional view of yet another femtoimager.
Figure 11B:
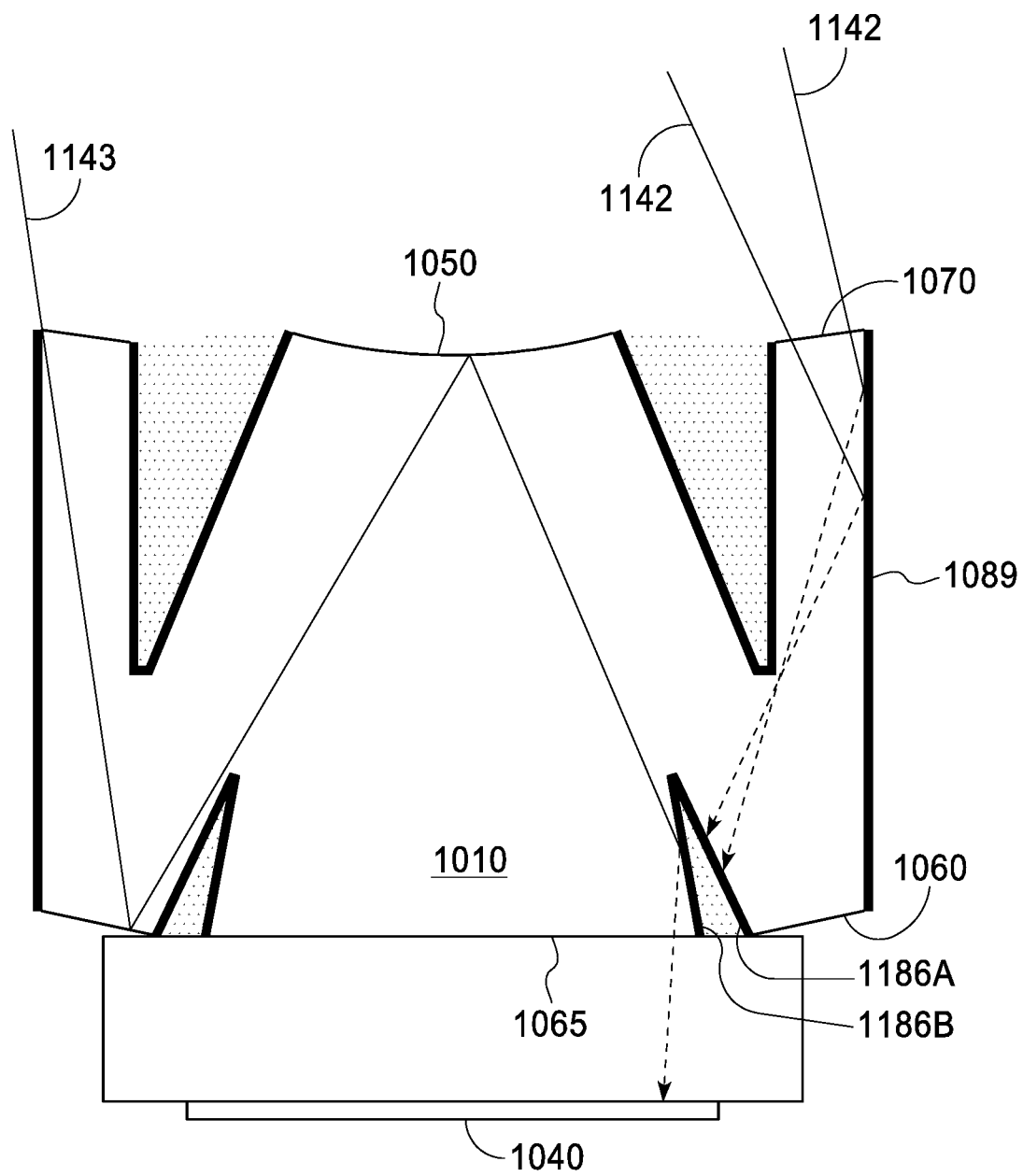
FIG. 11B shows reflected extraneous rays blocked by baffles in the femtoscope of FIG. 11A.

FIG. 11A shows a cross-sectional view of yet another femtoimager. FIG. 11A shows the same set of rays as in FIG. 10A. The femtoscope design in FIG. 11A is the same as in FIG. 10A, except that the output baffle is not an annular ring. Rather, it is a groove with two absorbing surfaces: outer surface 1186A and inner surface 1186B. As shown in FIG. 11A, this design of the output baffle does not block any of the image-forming rays, so the design is non-vignetting. However, it does block additional paths of extraneous rays to the image sensor 1040. Absorbing surfaces are not completely absorbing, so some low fraction of the incident light will be reflected off the baffle surfaces. As shown in FIG. 11B, residual reflection of extraneous rays 1142 off the side baffle 1089 would be directed to the image sensor 1040. The outer surface 1186A of the output baffle blocks these once-reflected extraneous rays 1142 from reaching the image sensor.

Figure 12:
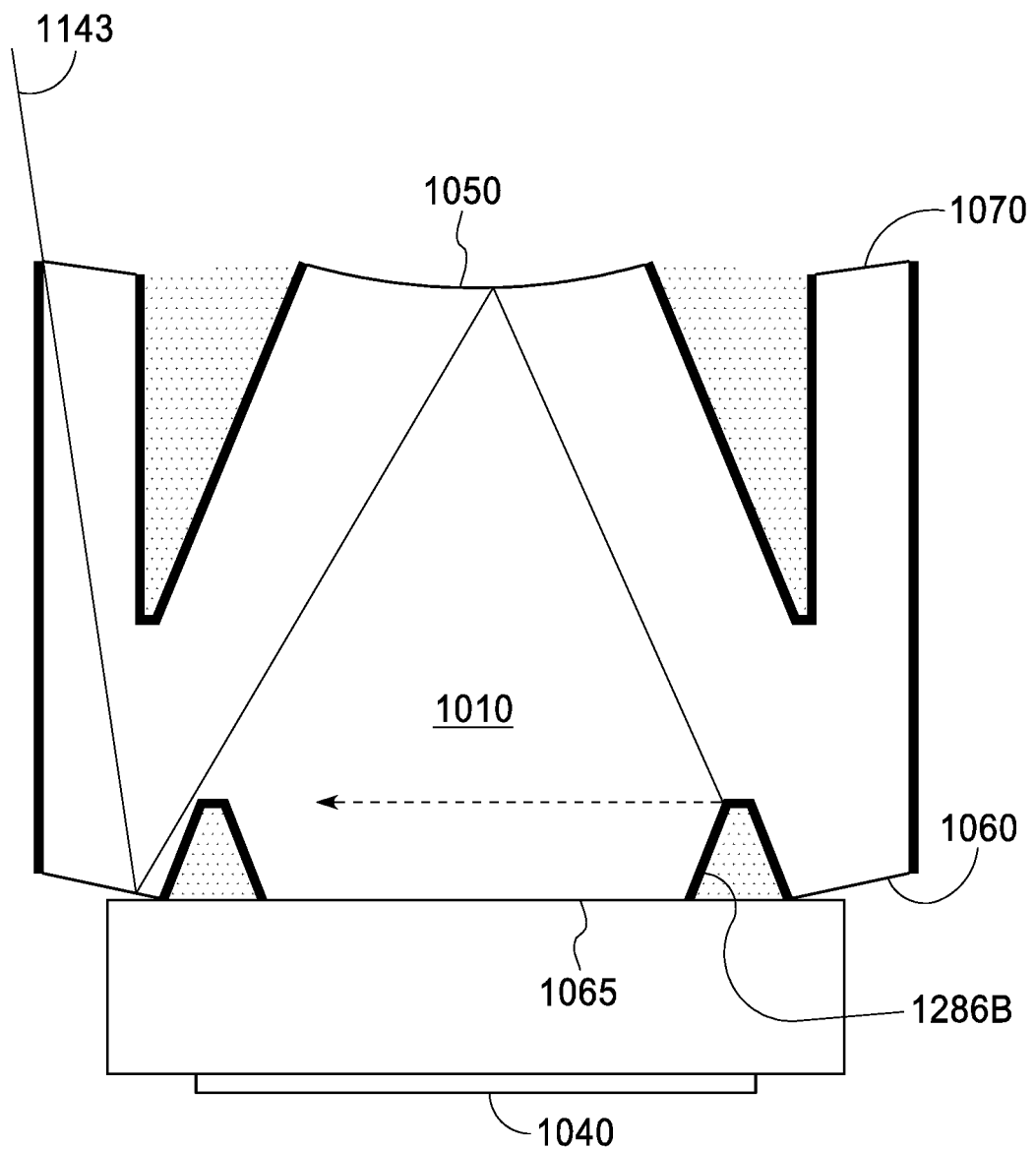
FIGS. 12-15 show cross-sectional views of additional femtoimagers.

FIG. 12 shows a cross-sectional view of yet another femtoimager that blocks additional extraneous rays. As shown in FIG. 11B, a small portion of extraneous ray 1143 from outside the field of view may be reflected by inner surface 1186B to the image sensor 1040. In FIG. 12, the inner surface 1286B of the output baffle is angled to reflect these residual extraneous rays 1143 away from the image sensor 1040 rather than towards it. The inner surface 1286B of the output baffle may vignette some of the image-forming rays.

Figure 13:
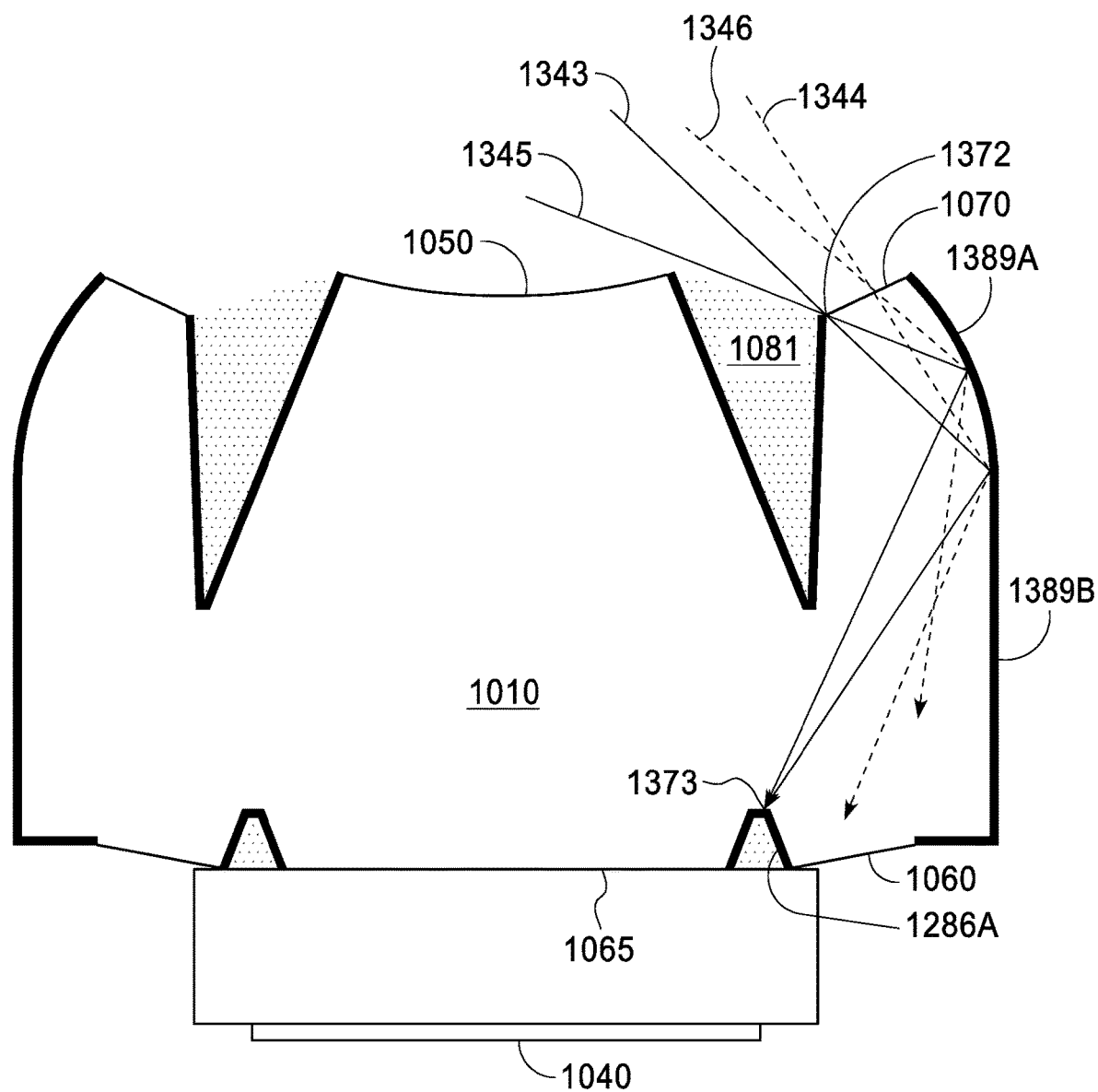

FIG. 13 shows a cross-sectional view of yet another femtoimager. In FIG. 13, the side baffle includes a curved section 1389A, followed by a straight section 1389B. In this design, the curved section 1389A is defined by an ellipse with two foci 1372 and 1373. The three-dimensional shape is an elliptical toroid. Focus 1372 is the inner edge of the input aperture 1070. Focus 1373 is the tip of the outer surface 1286A of the output baffle. Every ray that enters the femtoscope through focus 1372 and propagates to the elliptical section 1389A is primarily absorbed, but there may be some residual reflection to the other focus 1373. This design prevents these residual reflections from then propagating directly to the image sensor 1040.

Consider two points along the curved section 1389A as examples. First, ray 1343 enters through focus 1372 and hits the bottom point of the elliptical section 1389A. The non-absorbed portion of ray 1343 is reflected to focus 1373, and the outer surface 1286A of the output baffle blocks it from reaching the image sensor 1040. For all other rays 1344 that enter through the input aperture 1070 and hit the same bottom point of section 1389A, reflected light is reflected at a shallower angle and therefore also will be blocked from reaching the image sensor 1040 after only one reflection. The same construction can be made for any other point on the elliptical section 1389A. For example, ray 1345 is another ray that enters through focus 1372 and hits the elliptical section 1389A somewhere along its length. Reflected light is reflected to focus 1373. For all other rays 1346 that enter through the input aperture 1070 and hit the same point on the elliptical section 1389A, reflected light is reflected at a shallower angle and therefore also will be blocked from reaching the image sensor 1040 after only one reflection. The straight section 1389B is angled to also prevent reflected rays from propagating directly to the image sensor 1040. The ellipse 1389A plus straight section 1389B is just one possible design. Other shapes and curves may also be used to ensure that once-reflected rays do not have a direct path to the image sensor 1040.

Figure 14:
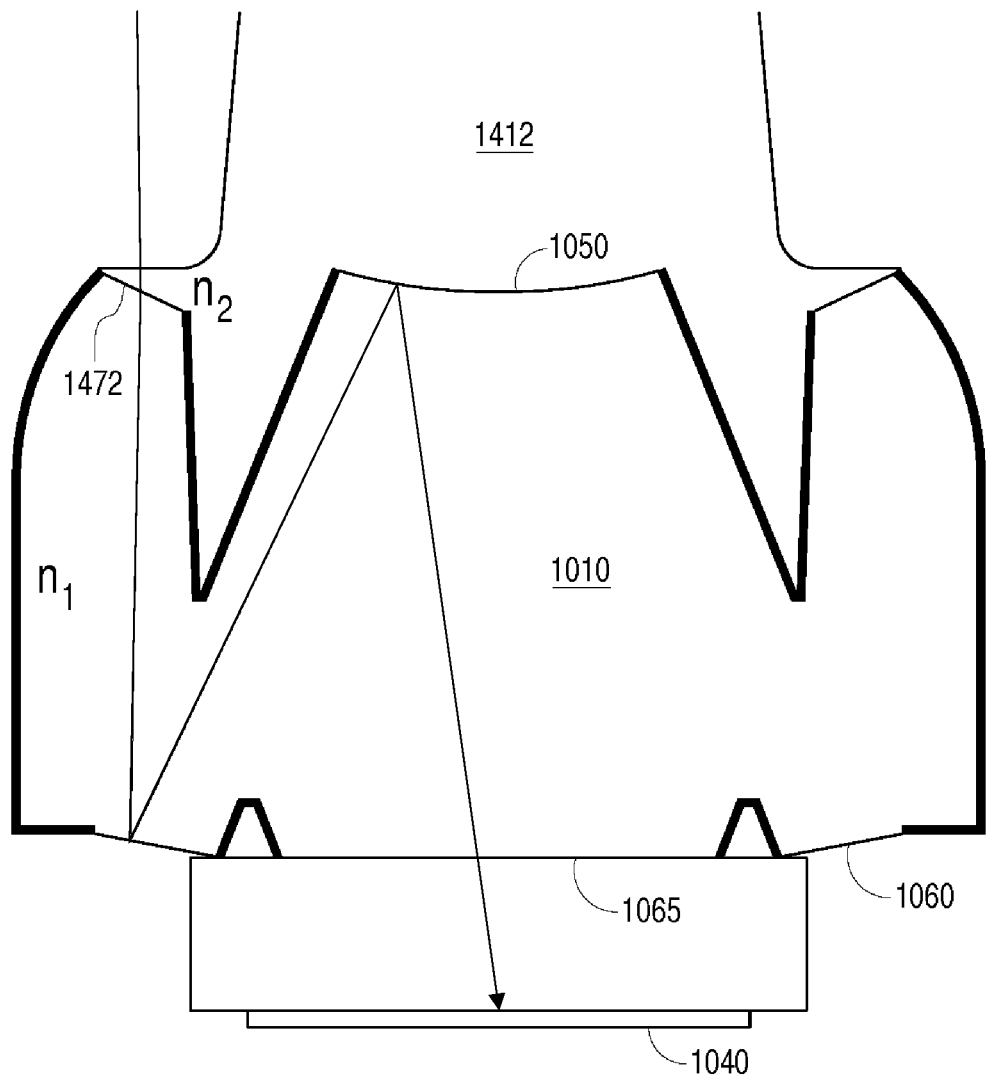
Figure 15:
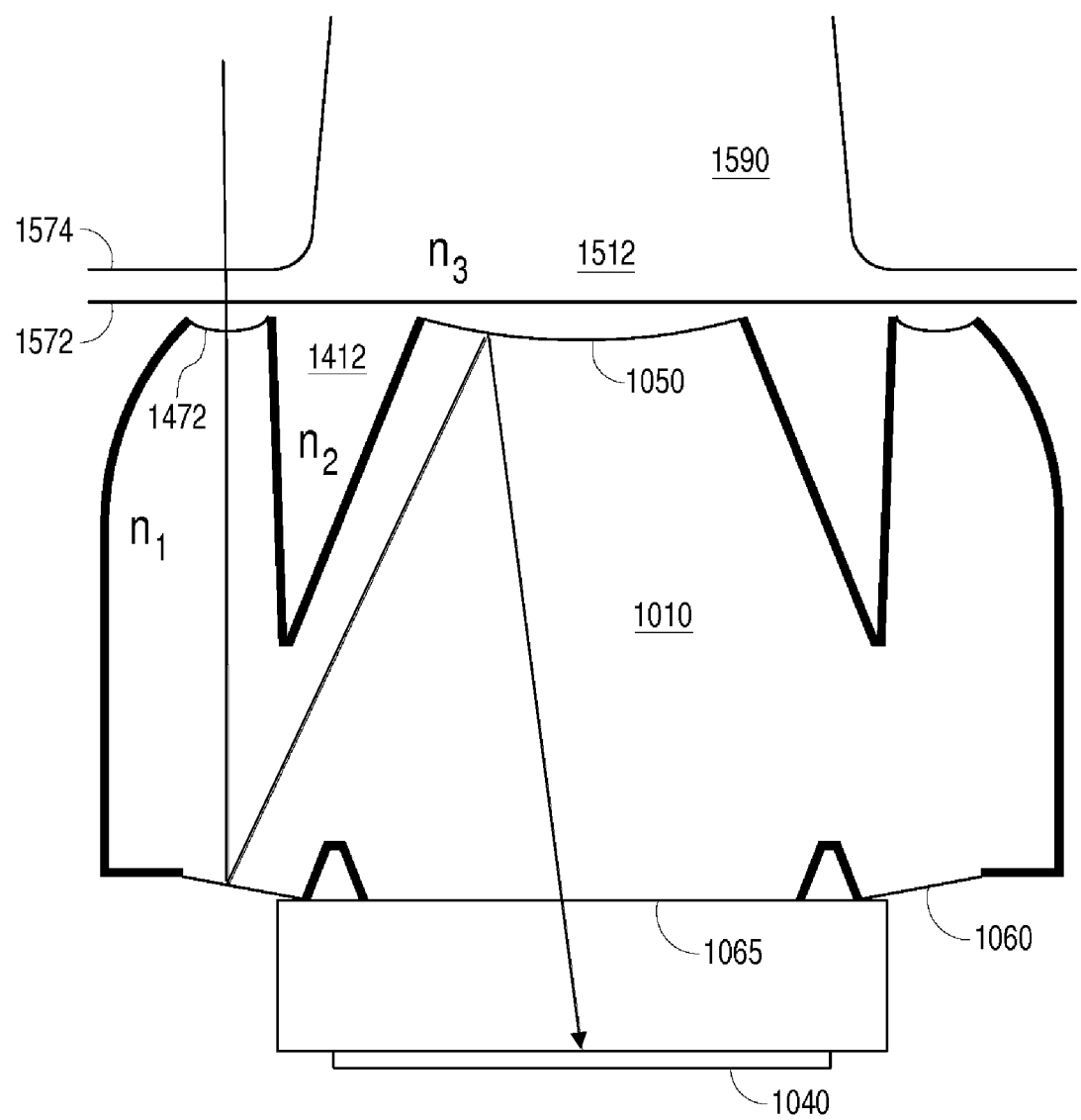

FIGS. 14-15 show cross sectional views of additional femtoimagers. These figures show the use of additional refractive interfaces in the femtoscope. In both FIGS. 14 and 15, the image-forming rays from the distant object propagate along optical paths that enter the solid transparent substrate 1010 with index $n_1$, reflect off the concave mirror 1060, reflect off the convex mirror 1050, and exit the substrate through a central opening (output aperture 1065) to the image sensor 1040. The femtoscope operates at near infinite conjugate ratio. The image sensor 1040 is close to the output aperture 1065 of the substrate. The femtoscope may also contain baffles—input baffles, output baffles and/or side baffles—as described previously.

In FIGS. 14-15, the rays refract at interface(s) before entering the substrate 1010, as described in more detail below. In FIG. 14, solid transparent material 1412 with index $n_2 \neq n_1$ creates a first additional interface 1472 with the substrate 1010. For example, index $n_1$ may be greater than 1.5, while index $n_2$ is less than 1.5. The difference between $n_1$ and $n_2$ may be greater than 0.1. In FIG. 15, solid transparent material 1512 with index $n_3 \neq n_2$ creates a second additional interface 1572. These interface(s) may be used to improve the image quality of the femtoscope.

The use of intermediate material 1412 in FIG. 15 may improve the optical power that may be achieved, because the refractive indexes $n_1$ and $n_3$ may be close to each other. The substrate 1010 may have a high index $n_1$. Index $n_3$ may also be high in order to match the contact lens material, or it may in fact be the actual contact lens material. Therefore, without an intermediate lower index material, the difference between indexes $n_1$ and $n_3$ may be low, which would then require a more severely shaped interface in order to achieve a desired refractive effect.

In FIG. 15, the intermediate material 1412 is introduced and index $n_2$ may be chosen to be significantly lower than both $n_1$ and $n_3$ so that the interfaces 1472, 1572 have more optical power to correct the image-forming rays. For example, both $n_1$ and $n_3$ may be 1.5 or greater for the reasons given above. If $n_2$ is selected to be 1.4 or less, then the difference in refractive index at each interface will be at least 0.1. In some embodiments, material 1512 may be Zeonex or acrylic and material 1412 may be silicone (PDMS) or low index UV-curable adhesives (e.g. from Norland). Interface 1472 may be concave or convex and is generally aspheric. Interface 1572 may be flat or curved. Exit surface 1574 may be convex spherical, with radius of curvature similar to the contact lens or cornea.

The intermediate material 1412 is encapsulated between the substrate 1010 and the outer material 1512. It could be something other than a solid, but solid materials have advantages over gases and liquids. Material 1512 interfaces to the rest of the contact lens. In some cases, material 1512 may be the contact lens material, so that exit surface 1574 is the exterior surface of the contact lens. If not, material 1512 may have the same index as the contact lens material.

In FIG. 15, material 1512 is shaped with a protrusion 1590, as is material 1412 in FIG. 14. The device shown in FIG. 15 is not the finished optical system. Rather, it is a precursor to the final device. The protrusion 1590 may be used to facilitate handling of the precursor and then removed either before or after assembly into the contact lens. For similar reasons, even if the exit surface 1574 is not the final exterior surface of the contact lens, it may have the same shape as the final surface to facilitate testing of the optical system.

A variety of femtoimager optical systems (femtoscopes) have been described. Each of them may be made small enough to fit in a contact lens using plastic injection molding, diamond turning, photolithography and etching, or other techniques. Most, but not all, of the systems include a solid cylindrical transparent substrate with a curved primary mirror formed on one end and a secondary mirror formed on the other end. Any of the designs may use light blocking, light-redirecting, absorbing coatings or other types of baffle structures as needed to reduce stray light.

When a femtoimager optical system is described as "cylindrical", its cylindrical shape may include a flat on a sidewall. In other words, the circular cross section of a perfect cylinder is not a requirement, just an overall cylindrical shape. Optical systems may also be made from extrusions of other shapes, such as triangles, squares, pentagons, etc.

Although the detailed description contains many specifics, these should not be construed as limiting the scope of the invention but merely as illustrating different examples. It should be appreciated that the scope of the disclosure includes other embodiments not discussed in detail above. For example, the designs above all use solid substrates, but an air core may also be used. As another example, although the femtoimager is described as embedded in a contact lens, small imaging devices may also be used in other applications, such as embedded in an eyeglasses lens, used in endoscopes, or mounted on drones. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A femtoscope optical system comprising:
   a solid transparent substrate comprised of a transparent first material having a refractive index $n_1$;
   a concave mirror positioned to a first side of the substrate, the concave mirror having a central opening;
   a convex mirror positioned to a second side of the substrate and opposite the central opening;
   a solid transparent second material having a refractive index $n_2$, positioned to the second side of the substrate; and
   a solid transparent third material having a refractive index $n_3$, also positioned to the second side of the substrate, the second material positioned between the third material and the substrate, the second material and substrate forming a first interface with $n_2 \neq n_1$, and the third material and second material forming a second interface with $n_3 \neq n_2$;

wherein the optical system projects image-forming rays from a first conjugate to a second conjugate; and the image-forming rays propagate along optical paths that originate from the first conjugate, refract at the second interface, refract at the first interface, enter the substrate, reflect off the concave mirror, reflect off the convex mirror, and exit the substrate through the central opening.

2. The optical system of claim 1 wherein the optical system operates at a near infinite conjugate ratio.

3. The optical system of claim 1 wherein a distance from the central opening to the second conjugate is less than a distance from the convex mirror to the central opening.

4. The optical system of claim 1 wherein $n_1-n_2 \geq 0.1$ and $n_3-n_2 \geq 0.1$.

5. The optical system of claim 1 wherein $n_1 \geq 1.50$, $n_3 \geq 1.50$, and $n_2 \leq 1.45$.

6. The optical system of claim 1 wherein $n_1$ and $n_3$ are closer to each other than to $n_2$.

7. The optical system of claim 1 wherein the second material comprises silicone.

8. The optical system of claim 1 wherein the second material comprises an adhesive.

9. The optical system of claim 1 wherein the third material is one of acrylic or Zeonex.

10. The optical system of claim 1 wherein the optical system is contained in a contact lens, and the third material is part of the contact lens.

11. The optical system of claim 1 wherein the optical system is contained in a contact lens, and a refractive index of the contact lens is substantially equal to $n_3$.

12. The optical system of claim 1 wherein the first interface and the second interface are both curved.

13. The optical system of claim 1 wherein the second interface is planar.

14. The optical system of claim 1 wherein the optical system is a precursor for assembly into a contact lens, and a surface of the third material opposite the second interface has a same shape as an exterior surface of the contact lens.

15. The optical system of claim 1 wherein the optical system is a precursor for assembly into a contact lens, and the third material is shaped with a protrusion.

16. The optical system of claim 1 further comprising an input baffle and an output baffle.

17. The optical system of claim 1 wherein the optical system is small enough to be mounted in a contact lens.

18. The optical system of claim 1 wherein the optical system is small enough to be contained within a 2 mm×2 mm×2 mm volume.

19. The optical system of claim 1 wherein the concave mirror and convex mirror contact the substrate.

20. The optical system of claim 1 wherein the substrate is plastic or glass.

* * * * *